United States Patent
Bucci

(10) Patent No.: US 8,581,707 B2
(45) Date of Patent: Nov. 12, 2013

(54) METHODS AND APPARATUS FOR IDENTIFYING AND CATEGORIZING DISTRIBUTED DEVICES

(75) Inventor: George Bucci, Southington, CT (US)

(73) Assignee: Pyramid Meriden Inc., Meriden, CT (US)

( * ) Notice: Subject to any disclaimer, the term of this patent is extended or adjusted under 35 U.S.C. 154(b) by 538 days.

(21) Appl. No.: 12/639,122

(22) Filed: Dec. 16, 2009

(65) Prior Publication Data

US 2011/0140864 A1 Jun. 16, 2011

(51) Int. Cl.
*H04Q 5/22* (2006.01)

(52) U.S. Cl.
USPC ..... 340/10.42; 340/10.1; 340/10.2; 340/10.3; 340/10.31; 340/10.32; 340/10.33; 340/10.34; 340/10.4; 340/10.41; 340/10.5; 340/10.6; 340/539.11; 340/539.21; 340/539.22; 340/539.23; 340/10.51; 340/10.52; 340/572.1; 340/572.2; 340/572.3; 340/572.4; 340/572.5; 340/572.6; 340/572.7; 340/572.8; 340/572.9

(58) Field of Classification Search
USPC .............. 340/10.4, 10.41, 10.42, 10.5, 10.51, 340/10.52, 539.11, 572.3, 572.4, 539.21, 340/539.22, 539.33, 10.1–10.6, 340/572.1–572.9, 539.23; 235/375
See application file for complete search history.

(56) References Cited

U.S. PATENT DOCUMENTS

| | | | |
|---|---|---|---|
| 4,370,600 A | | 1/1983 | Zansky |
| 4,868,795 A | | 9/1989 | McDavid |
| 4,945,210 A | * | 7/1990 | Yoshimura .................... 219/241 |
| 5,079,457 A | * | 1/1992 | Lu ................................. 361/100 |
| 5,519,878 A | | 5/1996 | Dolin, Jr. |
| 5,646,608 A | | 7/1997 | Shintani |
| 6,127,925 A | * | 10/2000 | Bonsignore et al. ...... 340/539.11 |
| 6,175,308 B1 | * | 1/2001 | Tallman et al. ........... 340/539.11 |
| 6,208,384 B1 | | 3/2001 | Schultheiss |
| 6,209,219 B1 | * | 4/2001 | Wakefield et al. ............... 33/761 |
| 6,324,008 B1 | * | 11/2001 | Baldwin et al. ................ 359/619 |
| 6,404,079 B1 | * | 6/2002 | Hsieh ............................ 307/117 |
| 6,407,779 B1 | | 6/2002 | Herz |
| 7,012,520 B2 | * | 3/2006 | Webb, Sr. ................. 340/539.13 |
| 7,151,460 B2 | * | 12/2006 | Makela et al. ................ 340/628 |

(Continued)

FOREIGN PATENT DOCUMENTS

WO    WO 2006/077280    7/2006

OTHER PUBLICATIONS

Brochure entitled "Introduction to ZigBee® RF4CE," Freescale Semiconductor, Inc., Freescale Technology Forum, Jul. 2009.

*Primary Examiner* — George Bugg
*Assistant Examiner* — Paul Obiniyi
(74) *Attorney, Agent, or Firm* — Maurice M. Klee

(57) ABSTRACT

Systems for identifying and categorizing distributed devices, e.g., lighting fixtures and thermostats, is disclosed. In an embodiment, a user (200) sends a low power discovery message to devices (201) using a portable programming tool (100). The devices (201) within range respond with identification information. The portable programming tool (100) organizes the responses by proximity and sends a "flash" message to the device with the closest perceived proximity. That device responds with a visual or audible signal (202), allowing the user (200) to determine whether that device is the one intended for selection. If so, the user initiates a store routine in which identification information, including category information, is stored in one or more locations, such as, the selected device (201), the portable programming tool (100), and/or a central or local controller (1100). The identification and categorization can, for example, be used to automate load shedding and to reduce energy consumption.

28 Claims, 13 Drawing Sheets

(56) References Cited

U.S. PATENT DOCUMENTS

| | | | |
|---|---|---|---|
| 7,222,800 B2* | 5/2007 | Wruck | 236/51 |
| 7,284,689 B2 | 10/2007 | Jeffery | |
| 7,298,275 B2 | 11/2007 | Brandt et al. | |
| 7,503,478 B2* | 3/2009 | Jeffery | 235/375 |
| 7,605,702 B2* | 10/2009 | Uchimura et al. | 340/572.1 |
| 7,710,271 B2* | 5/2010 | Frumau | 340/572.1 |
| 7,746,241 B2* | 6/2010 | Feight et al. | 340/635 |
| 7,825,793 B1* | 11/2010 | Spillman et al. | 340/539.1 |
| 7,911,338 B2* | 3/2011 | Naeve et al. | 340/539.23 |
| 8,059,006 B2* | 11/2011 | Schweitzer et al. | 340/635 |
| 8,072,312 B2* | 12/2011 | Chiang | 340/10.34 |
| 8,093,817 B2* | 1/2012 | Frumau et al. | 315/151 |
| 8,112,753 B2* | 2/2012 | Van Riel et al. | 718/102 |
| 8,134,461 B2* | 3/2012 | Van Doorn | 340/539.17 |
| 2003/0222587 A1* | 12/2003 | Dowling et al. | 315/149 |
| 2004/0027586 A1* | 2/2004 | Ichikawa et al. | 356/614 |
| 2005/0040247 A1* | 2/2005 | Pouchak | 236/44 C |
| 2005/0040248 A1* | 2/2005 | Wacker et al. | 236/51 |
| 2005/0040249 A1* | 2/2005 | Wacker et al. | 236/51 |
| 2005/0040250 A1* | 2/2005 | Wruck | 236/51 |
| 2006/0028997 A1* | 2/2006 | McFarland | 370/252 |
| 2006/0044152 A1* | 3/2006 | Wang | 340/825 |
| 2006/0266949 A1* | 11/2006 | Bender et al. | 250/370.1 |
| 2007/0076682 A1* | 4/2007 | Kim et al. | 370/349 |
| 2007/0114291 A1* | 5/2007 | Pouchak | 236/44 C |
| 2007/0232288 A1* | 10/2007 | McFarland et al. | 455/423 |
| 2007/0242688 A1* | 10/2007 | McFarland | 370/445 |
| 2008/0074253 A1 | 3/2008 | Jeffery | |
| 2008/0125057 A1* | 5/2008 | Nass et al. | 455/73 |
| 2009/0014625 A1 | 1/2009 | Bartol et al. | |
| 2009/0095889 A1* | 4/2009 | Bender et al. | 250/221 |
| 2009/0102640 A1* | 4/2009 | McFarland | 340/539.1 |
| 2009/0251352 A1* | 10/2009 | Altonen et al. | 341/176 |
| 2010/0075576 A1* | 3/2010 | Kobayashi et al. | 451/5 |
| 2011/0193818 A1* | 8/2011 | Chen et al. | 345/174 |

* cited by examiner

METHODS AND APPARATUS FOR IDENTIFYING AND CATEGORIZING DISTRIBUTED DEVICES

FIELD

This disclosure relates to methods and apparatus for identifying, categorizing, and, optionally, controlling distributed devices.

In one embodiment, the methods and apparatus are used to control energy usage and, in particular, to efficiently categorize, by location and/or by type, the energy consuming devices of an industrial, commercial, governmental, or similar facility. For ease of presentation, parts of the following discussion are in terms of this embodiment, it being understood that the focus on energy usage is only to facilitate the description and is not intended to limit the scope of the invention in any manner.

NOMENCLATURE

To provide a consistent and more easily readable nomenclature, plurals of the various abbreviations used herein are indicated by the construction "(s)".

BACKGROUND

Facilities management has become a highly specialized engineering discipline with major professional societies dedicated to its further development both in the United States and abroad. See, for example, the American Society of Heating, Refrigerating and Air Conditioning Engineers (ASHRAE) in the United States and the Chartered Institution of Building Services Engineers (CIBSE) in the UK. Among the many goals of a facility manager is to reduce energy consumption, both for environmental and economic reasons.

An important tool in effective facilities management is the ability to electronically communicate with operating equipment (including controllers for such equipment) distributed within a facility, either from one or more centralized locations or locally. Examples of the types of operating equipment which can be monitored/controlled using such communication include lighting devices (e.g., incandescent lights, fluorescent lights, and/or LED lights), heating, air conditioning, and ventilation equipment and/or the controls for such equipment (e.g., thermostats in different parts of a facility), and in the case of a manufacturing plant, some or all of the equipment or equipment controllers used in manufacturing a product. In a typical application, different settings will be established for individual pieces of equipment or groups of equipment depending on such variables as the equipment's location in the facility, the type of equipment, the time of day, the day of the week, the season, the level of business activity (e.g., the number of manufacturing shifts), and the like.

To permit such communication, modern operating equipment and/or controllers for such equipment are often equipped with a communications port which allows a remote computer to set the equipment's operating state (e.g., on or off in the case of lighting, the set temperature of a thermostat, and the like). Various known methods can be used to connect the controlled device to the computer, e.g., hardwiring, Ethernet, or RF signals.

Unfortunately, the efficient categorizing of controlled equipment by location and/or type in a facility has proven to be a difficult problem. The current art uses the brute force approach of tagging each piece of equipment before it is installed and then making sure that each individual piece is installed at its intended location and that no substitutions take place during installation. As can be imagined, in practice, this approach can be a nightmare, especially for equipment which may have numerous repeats in a single facility (e.g., thermostats which can number in the hundreds and fluorescent fixtures which can number in the thousands for a major office building).

U.S. Pat. Nos. 7,284,689 and 7,503,478 to R. Clark Jeffery disclose equipment identification systems based on bar code or RFID tags. See also PCT Patent Publication No. WO 2006/077280. Significantly, none of these references deal with the real world situation where a given location in a facility will have multiple pieces of equipment that need categorization. In particular, these references do not disclose how to distinguish one piece of equipment from its neighbor and how to confirm that the desired piece of equipment has been categorized. The facilities manager is thus still left with the problem of verifying that his/her facility map is accurate and reliable. The present disclosure addresses this problem and provides solutions to the problem that can be efficiently implemented in a cost effective manner.

SUMMARY

In accordance with a first aspect, a method is disclosed for identifying an individual electrical device among a plurality of spatially-distributed electrical devices, each of the devices having associated therewith an RF transceiver, the method including:

(A) broadcasting, from a portable device, an RF discovery request to the spatially-distributed electrical devices requesting RF transmissions from the devices of identification information, the identification information including at least an identification number;

(B) receiving, at the portable device, RF transmissions including identification numbers returned by devices as a result of step (A) and determining a perceived proximity for each received RF transmission;

(C) ordering the identification numbers received in step (B) by perceived proximity;

(D) selecting an identification number from the ordered identification numbers of step (C), the selected identification number corresponding to the device having the closest perceived proximity, and then, as selected by an operator, performing at least one of:

(i) transmitting an RF signal to the device associated with the selected identification number so as to cause the device to produce a visual or audible signal;

(ii) transmitting an RF signal to the device associated with the selected identification number so as to cause the device to store category information for the device;

(iii) storing category information for the device associated with the selected identification number in a memory associated with the portable device and/or in a memory associated with a remote controller; and (E) optionally, as selected by an operator, repeating step (D) with at least one other identification number corresponding to a device having a perceived proximity greater than the closest perceived proximity.

In accordance with a second aspect, a system is disclosed which includes:

(A) a plurality of spatially-distributed electrical devices, each of the devices having associated therewith an RF transceiver and a microprocessor programmed to perform at least the following operations:

(i) receive an RF discovery request from a portable programming tool; and (ii) transmit an RF signal including an identification number in response to the RF discovery request;

(B) a portable programming tool including an RF transceiver and a microprocessor system programmed to perform at least the following operations:
  (i) broadcasting an RF discovery signal which requests spatially-distributed electrical devices to return at least an identification number;
  (ii) receiving RF signals from spatially-distributed electrical devices, the RF signals including identification numbers, and determining a perceived proximity for each received RF signal;
  (iii) ordering the identification numbers by perceived proximity;
  (iv) selecting an identification number from the ordered identification numbers, the selected identification number corresponding to the device having the closest perceived proximity,
  (v) receiving an operator input and based on that input, performing at least one of:
    (a) transmitting an RF signal to the device associated with the selected identification number so as to cause the device to produce a visual or audible signal;
    (b) transmitting an RF signal to the device associated with the selected identification number so as to cause the device to store category information for the device;
    (c) storing category information for the device associated with the selected identification number in a memory associated with the portable device and/or in a memory associated with a remote controller; and
  (vi) optionally, receiving an operator input and based on that input, repeating (v) with at least one other identification number corresponding to a device having a perceived proximity greater than the closest perceived proximity.

In accordance with a third aspect, a portable programming tool is disclosed which includes:
(A) an RF transceiver, and
(B) a microprocessor system programmed to perform at least the following operations:
  (i) broadcasting an RF discovery signal which requests electrical devices to return at least an identification number;
  (ii) receiving RF signals from electrical devices, the RF signals including identification numbers, and determining a perceived proximity for each received RF signal;
  (iii) ordering the identification numbers by perceived proximity; and
  (iv) selecting an identification number from the ordered identification numbers, the selected identification number corresponding to the device having the closest perceived proximity, and
  (v) receiving an operator input and based on that input, performing at least one of:
    (a) transmitting an RF signal to the device associated with the selected identification number so as to cause the device to produce a visual or audible signal;
    (b) transmitting an RF signal to the device associated with the selected identification number so as to cause the device to store category information for the device.

In accordance with a fourth aspect, apparatus is disclosed which includes:
(A) an electrical device which needs to be identified and categorized;
(B) an RF transceiver; and
(C) a microprocessor programmed to perform at least the following operations:
  (i) receive an RF discovery request from a programming tool;
  (ii) transmit an RF signal including an identification number in response to the RF discovery request;
  (iii) receive an RF signal from the programming tool and thereupon produce a visual or audible signal; and
  (iv) receive an RF signal from the programming tool and thereupon store category information for the device in a memory associated with the microprocessor.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations. More generally, it is to be understood that both the foregoing general description and the following detailed description are merely exemplary of the invention and are intended to provide a non-limiting overview or framework for understanding the nature and character of the invention.

Figure 10:
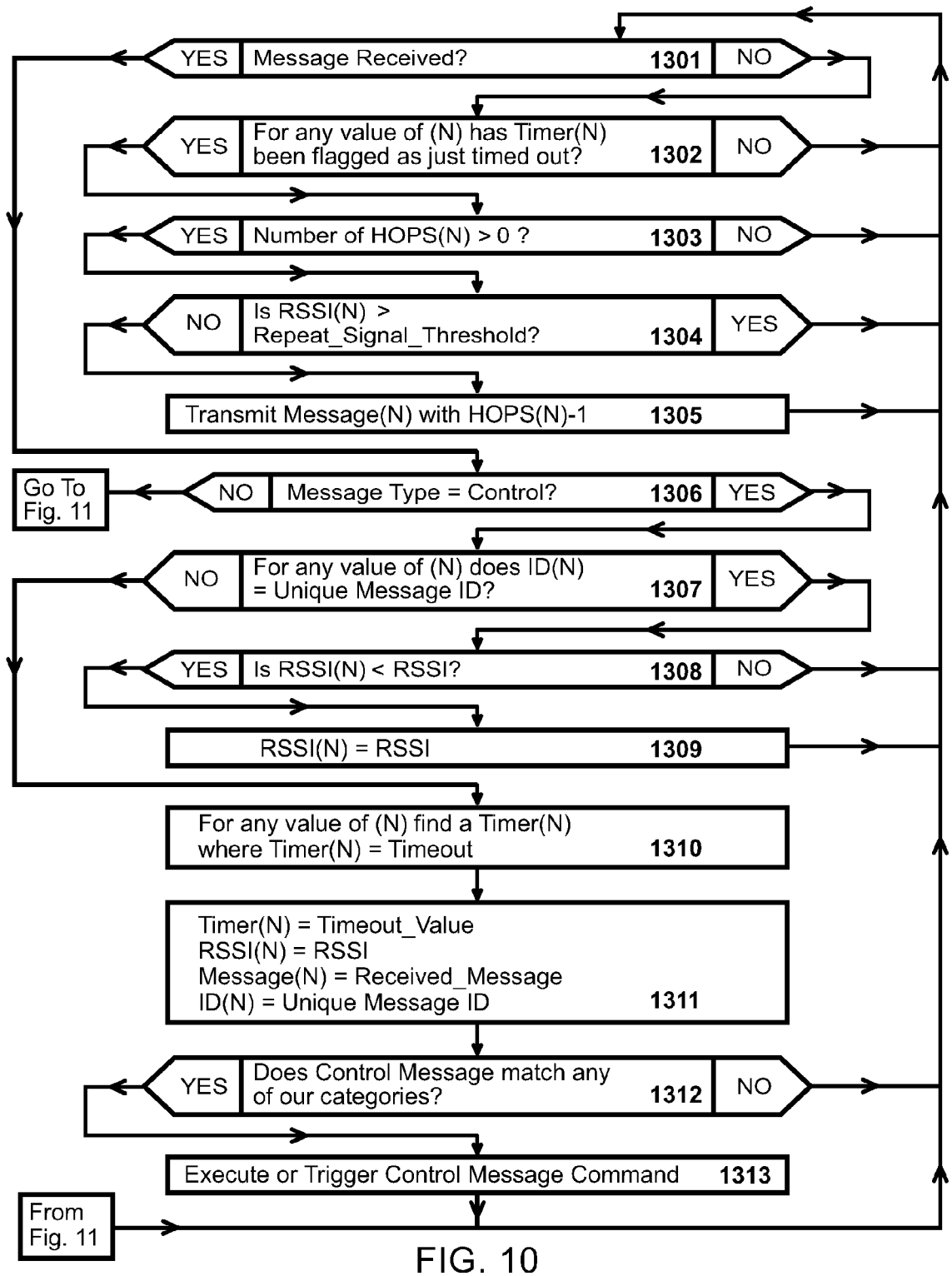
FIGS. 10 and 11 are flow charts showing an embodiment of programming and operation of a CAsm.

The reference numbers used in the drawings refer to the following:
  100 PPTool
  102 PPTool display
  104 PPTool keypad
  106 DISCOVER button
  108 STORE button
  110 NEXT button
  112 EXIT button
  200 operator
  201 light fixture
  202 light flash
  250 thermostat 252 light switch
300 microprocessor subunit
302 external device interface
304 serial interface
306 timers
308 oscillator
310 real time clock
312 clock generator circuit
314 CPU
316 nonvolatile memory
318 program memory
320 RAM
322 transceiver interface
324 crystal
326 serial peripheral interface port
340 microprocessor circuitry
350 transceiver subunit
352 microprocessor interface
354 power amplifier (PA)
356 mixer
358 filter
360 digital-to-analog converter (DAC)
362 digital modulator
364 crystal-controlled oscillator
366 frequency synthesizer
368 low noise amplifier
370 filter
372 mixer
374 analog to digital converter (ADC)
376 digital filter and demodulator
378 automatic gain controller (AGC)
380 filtering and antenna matching network
384 crystal
386 antenna
390 transceiver circuitry
400 fluorescent lamps
402 inductive/capacitive matching circuit
404 half bridge switch
406 power factor correction circuit
408 low voltage power supply
410 AC power
412 capacitive coupling
414 filter
420 ballast interface
430 antenna
500 thermostat display
502 thermostat keypad
504 thermostat temperature sensor
506 display interface
508 keypad interface
510 temperature sensor interface
600 portable device
602 USB stick
604 housing for USB RF unit
608 communication device
610 cradle for communication device
702 PPTool's keypad and buttons
704 PPTool's display
706 interface to PPTool's keypad and buttons
708 interface to PPTool's display
804 USB port
808 USB connector
806 USB cable
810 USB controller
812 USB controller interface
1002 Ethernet connection
1006 Ethernet controller
1008 display
1010 Ethernet interface
1012 display interface
1016 antenna
1100 local CCtrl device
1301-1313 numbered flowchart blocks of FIG. 10

DETAILED DESCRIPTION

The present disclosure is directed to the problem of identifying, categorizing, and, in some embodiments, controlling substantial numbers, typically, much greater than 20, of distributed electrical devices. Such devices can, for example, be devices that perform generally the same function, such as, lighting fixtures distributed throughout an industrial, commercial, governmental, or similar facility. All of the lighting fixtures perform generally the same function of providing illumination, although, of course, some fixtures may provide more illumination than others. Likewise, some fixtures may provide specialized illumination, e.g., task lighting, while others provide area illumination. In a typical setting, similar fixtures or just a few types of fixtures are used throughout a given facility. As a result of these considerations, the problem of identifying, categorizing, and then controlling individual lighting fixtures or groups of fixtures has proved very challenging and to date there has been no efficient method for addressing this problem.

Similar problems apply to the heating/cooling of large facilities where numerous zones are common. Other contexts in which multiple devices perform generally the same function include golf course sprinkler systems where multiple spray heads are distributed over the course and need to be grouped for efficient water usage with the output of the groups being different depending on the season and local weather conditions. It can thus be seen that the problem of identifying, categorizing, and controlling multiple devices which perform generally the same function arises in a variety of contexts, in none of which has the problem been solved in a satisfactory manner.

To address the problems associated with identifying, categorizing, and controlling the foregoing and other types of devices (referred to herein as "spatially-distributed devices" or "SDD(s)"), in some embodiments, the present disclosure employs three basic elements:
 (1) at least one portable programming tool (PPTool),
 (2) at least one central controller (CCtrl), which itself may be a PPTool, and
 (3) a controller associated with each of the SDD(s) that includes an RF unit, the combination of a controller and its associated SDD being referred to herein as a controllable assembly (CAsm).

By means of the controllers and their RF units, each of the one or more PPTool(s) and each of the one or more CCtrl(s) is able to communicate with each of the CAsm(s) and thus control each of the SDD(s). As discussed below, the one or more PPTool(s) are used to identify and initially categorize the CAsm(s), while the one or more CCtrl(s) (or, in some embodiments, the one or more PPTool(s) either alone or in combination with one or more CCtrl(s)) are used to communicate with the CAsm(s) and thus control the SDD(s). In certain embodiments, the one or more CCtrl(s) (or, in some embodiments, the one or more PPTool(s)) can also be used for re-categorization or sub-categorization of the initial categorization.

For ease of presentation, the description which follows is organized as follows:
 I. Controllable Assemblies (CAsm(s))
 II. Identification and Categorization of CAsm(s)
 III. The Portable Programming Tool (PPTool)

A. Introduction
B. Examples of Physical Embodiments of PPTool(s)
C. Example of PPTool Circuitry
D. Example of PPTool and CAsm Programming and Operation IV. The Central Controller (CCtrl)

V. Representative Scenarios
A. Load Shedding by Power Companies or Power Aggregators
B. Setting Night Lights Before turning to the above outline, for purposes of providing an overview, it is helpful to consider a specific (non-limiting) example of a CAsm/PPTool/CCtrl system where the SDD(s) are overhead light fixtures, e.g., 2 or 4 bulb fluorescent light fixtures. This example is especially relevant because commercial lighting consumes approximately the same amount of energy as heating/cooling and the number of lighting fixtures in facilities are so great as to make manual identification and categorization impractical in view of the extensive deployment and updating expense, and the effort and expense needed to correct inevitable errors.

Figure 1:
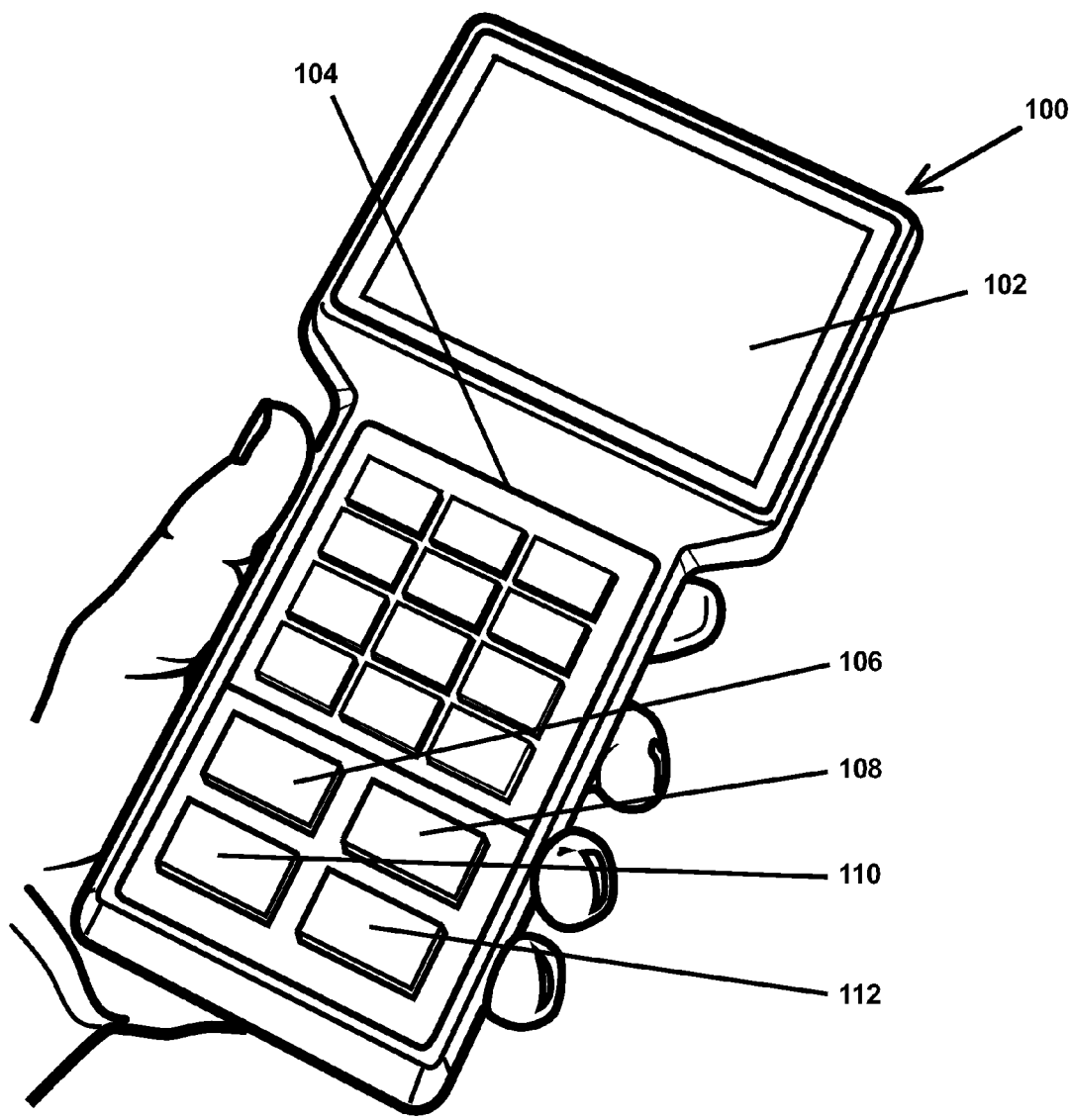
FIG. 1 is a drawing illustrating a handheld embodiment of a PPTool.
Figure 2:
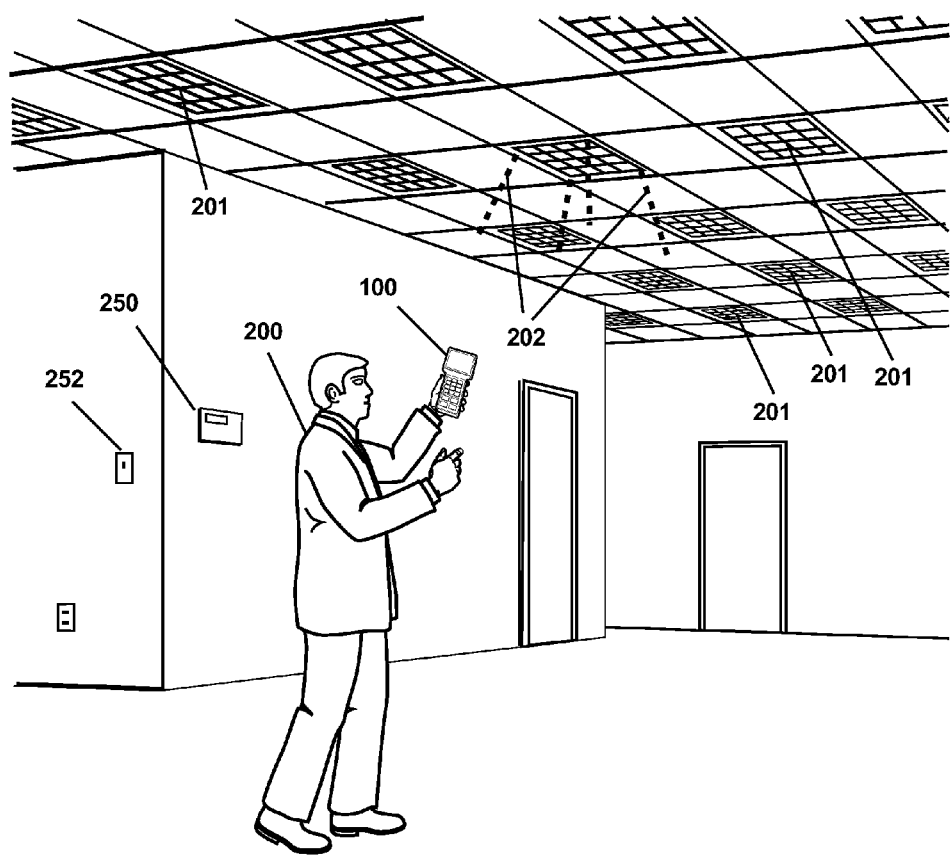
FIG. 2 is a drawing showing an operator using the handheld PPTool of FIG. 1 to identify and categorize light fixtures in a commercial facility.

For this example, it is assumed that each fluorescent fixture (each SDD) has associated therewith a controller which includes an RF unit so that it can function as a CAsm. For ease of presentation, it will be assumed that there is a single PPTool and a single CCtrl, with the PPTool being a dedicated handheld device. As illustrated in FIGS. 1 and 2, for this example, when an initial identification/categorization procedure or an operator-based identification/re-categorization procedure is to be performed, an operator 200 will enter a room containing a number of light fixtures 201 with a PPTool 100. In addition to the light fixtures, the room can also include a thermostat 250 and a switch 252, either or both of which can also be a CAsm.

The process begins with the operator 200 positioning the PPTool 100 relatively close to a first light fixture (first SDD) that needs to be discovered. The operator then presses the PPTool's DISCOVER button 106. In response, the PPTool transmits a low power DISCOVERY message requesting all CAsm(s) which include a SDD of a certain type, i.e., in this case, all CAsm(s) whose SDD is a light fixture, to respond with identification information. Alternatively, pressing button 106 can cause all CAsm(s) irrespective of their SDD type to respond with identification information.

In response to the discovery request, i.e., the DISCOVERY message, all relevant CAsm(s) within range (where range may include a signal strength criterion; see below) respond with their identification information (i.e., at least an identification number) at low RF power. Those responses are stored by the PPTool along with proximity information, which in this introductory discussion will be assumed to be the RF signal strengths of the responses, it being understood that, as discussed below, the proximity information can be based on time of flight. After sorting the responses by signal strength, a FLASH message (i.e., a message to produce a human-perceivable visual or audible signal; e.g., light flash 202 in FIG. 2) is sent to the CAsm with the strongest RF signal using the assembly's identification number so that only that assembly responds.

In most cases, the CAsm with the strongest RF signal and thus the assembly which responds to the FLASH message will be the assembly closest to the operator, but in some infrequent cases the assembly that responds can be a more remote assembly due to, for example, local reflections or absorptions of the RF communication signals. If upon perceiving the response of the CAsm with the strongest RF signal to the FLASH message, e.g., upon perceiving the light flash 202 in FIG. 2, the operator accepts the SDD of that CAsm as the correct device, the operator presses the PPTool's STORE button 108.

The resulting STORE command causes the PPTool to save identification information for the CAsm in the PPTool's non-volatile memory and/or in the nonvolatile memory of the CCtrl. The identification information includes at least the CAsm's identification number as well as category information for subsequent use in, for example, controlling the SDD, e.g., device type category information, spatial location category information, type of use category information, etc. The STORE command can also cause a transmission containing category information to be sent to the CAsm for storage in the assembly's nonvolatile memory.

Thereafter, the operator can press NEXT button 110 which will cause the PPTool to send a FLASH message to the CAsm with the next strongest RF signal. Upon observing the response of the SDD associated with that CAsm, the operator decides whether or not its identification information (i.e., identification number and category information) should be stored in the same manner as the first SDD. Typically, the process is repeated until all devices within range of the DISCOVERY message have been enumerated, but in some cases, the operator may terminate the process early, e.g., during re-categorization where only some of the SSD(s) need to be communicated with. Once the operator has completed the identification process in one location, he/she can move to a new location and press the DISCOVER button to repeat the process for a new set of SDD(s).

Depending on the distance between the two locations and the RF signal strength of the DISCOVERY message, there may be overlap between the CAsm(s) that respond to the discovery request at the two locations. The operator can use the NEXT button to skip over a CAsm which has already been identified and categorized, or can add additional information or substitute new information for the CAsm as appropriate.

Once the CAsm(s) have been identified, the CCtrl and/or the PPTool can be used to provide lighting control for the facility. As just one example, the CCtrl can use the identification information acquired through the discovery process to provide reduced illumination at certain locations during the evening or at other times when the facility is not in use. Other non-limiting examples are discussed below in Section V.

The message from the CCtrl and/or a control message from the PPTool will normally have the following components: (1) category information identifying which CAsm(s) are relevant; and (2) an instruction to the CAsm on what is to be done. Alternatively, the message could have: (1) the CAsm's identification number; and (2) an instruction to the CAsm on what is to be done. In either case, if the CAsm(s) are going to be used to repeat the message (see below), the message will in addition normally contain: (3) a message ID which at least over the relevant time period is unique, and (4) the number of times the message should be retransmitted by the CAsm(s) (the HOPS value; see below).

With the foregoing specific example as background, we now turn to a discussion of the topics set forth in the above outline.

I. Controllable Assemblies (CAsm(s))

In one embodiment, the controllable assemblies (CAsm(s)) comprise (1) one of the plurality of spatially-distributed devices (SDD(s)) and (2) a SDD-controller which comprises a microprocessor with associated memory, a microprocessor-SDD interface, and an RF unit, i.e., an RF transceiver controlled by the microprocessor, where the RF transceiver provides the CAsm with RF communication to:

(a) one or more PPTool(s), (b) one or more CCtrl(s), and/or (c) in embodiments employing message retransmission, one or more other CAsm(s).

Figure 3:
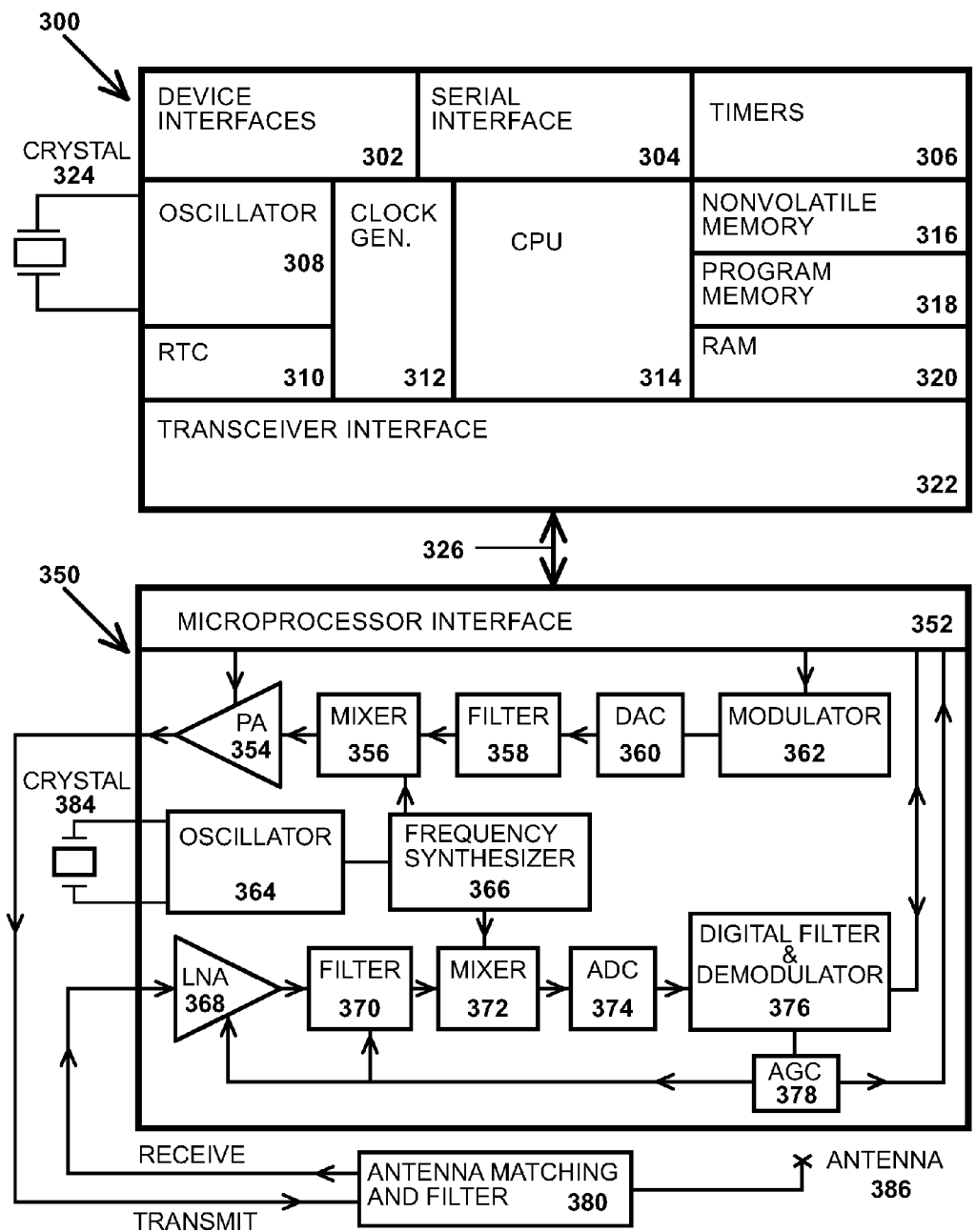
FIG. 3 is a circuit block diagram of an embodiment of microprocessor and transceiver hardware that can be used in a CAsm, a PPTool, and/or a CCtrl.

FIG. 3 shows representative microprocessor/RF transceiver circuitry that can be used as a SDD-controller. As discussed below, circuitry of the same general type with different programming and device interfaces can be used in the PPTool and/or the CCtrl for effecting RF communication, which can be advantageous in reducing system design costs.

As can be seen in FIG. 3, the SDD-controller includes two main subunits, i.e., microprocessor subunit 300 and transceiver subunit 350. The microprocessor subunit includes CPU 314, program memory 318, and RAM 320, as well as crystal 324, oscillator 308, and a clock generator circuit 312, and, depending on the specific SDD (or PPTool or CCtrl), a real time clock 310, a nonvolatile memory 316, one or more timers 306, a serial interface 304, and interfaces 302 to external devices. In the case of SDD(s), the microprocessor subunit 300 can, for example, have 8K to 64K of program memory and a clock speed of approximately 30 megahertz. Suitable devices are commercially available from various suppliers, e.g., FREESCALE, TEXAS INSTRUMENTS, and ATMEL. The microprocessor subunit and transceiver subunit typically communicate through a serial peripheral interface (SPI) port 326 between the microprocessor's transceiver interface 322 and the transceiver's microprocessor interface 352.

Transceiver subunit 350 is composed of a transmitter portion, e.g., a digitally-controlled transmitter, and a receiver portion. Common to both the transmitter and the receiver are a crystal-controlled oscillator 364, its associated crystal 384, and a frequency synthesizer 366 whose frequency is controlled by the microprocessor subunit 300 through the SPI port. As shown in FIG. 3, the digitally-controlled transmitter includes a digital modulator 362 which receives a data stream from the microprocessor subunit and provides an output to a digital-to-analog converter (DAC) 360. The output of the DAC is filtered by filter 358 and then mixed by mixer 356 with a synthesized frequency from frequency synthesizer 366 to generate the RF signal. This signal is amplified by power amplifier (PA) 354 whose gain is controlled by the microprocessor subunit, thereby controlling the RF signal power. The output of the power amplifier is coupled to antenna 386 through filtering and antenna matching (impedance matching) network 380.

The receiver portion of transceiver subunit 350 receives a signal through antenna 386 and the signal is filtered and coupled through matching network 380 to low noise amplifier 368, whose gain is controlled by automatic gain controller (AGC) 378. This received signal is passed through filter 370 and then mixed by mixer 372 with the synthesized frequency produced by frequency synthesizer 366. The output of the mixer is fed to analog to digital converter (ADC) 374. Its output is digitally filtered and demodulated in unit 376, and the demodulated signal is then sent to the microprocessor subunit through the SPI interface. The signal level received at digital demodulator 376 is used to control the AGC level so as to control the gain of the low noise amplifier 368 and filter 370 to keep the signal strength substantially constant through the filter, mixer, and demodulator. Suitable transceiver subunits 350 are commercially available from various suppliers, e.g., ANALOG DEVICES, TEXAS INSTRUMENTS, and ATMEL.

As indicated above, microprocessor subunit 300 includes a device interface. The specific interface used will depend on the particular type of SDD that is being controlled. For example, in the case of a fluorescent light fixture, the device interface can be as simple as applying a control signal from microprocessor subunit 300 to a power switch, e.g., a TRIAC or relay, which turns the fluorescent fixture on and off. Note that the power switch can be equipped with a tone generator and/or a light source so that it can respond to a FLASH message from a PPTool. Alternatively, the SDD-controller can be programmed to briefly activate the power switch and thus cause the fluorescent fixture to flash in response to the FLASH message.

Figure 4:
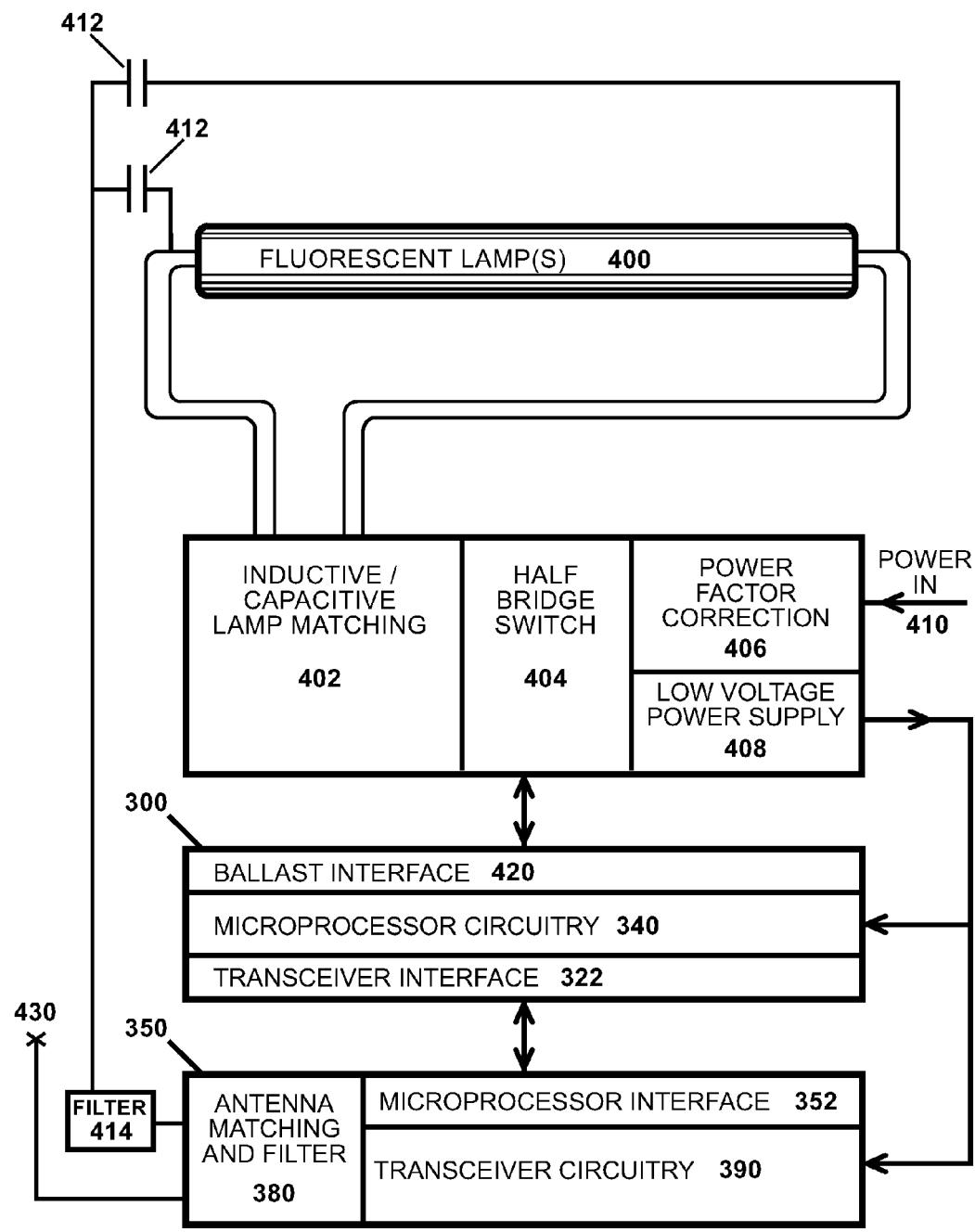
FIG. 4 is a circuit block diagram of an embodiment of a fluorescent fixture CAsm.

FIG. 4 shows a more sophisticated fluorescent light CAsm which includes an interface that achieves variable light output with feedback to the microprocessor. In this embodiment, one or more fluorescent lamps 400 are powered by AC power 410. The power in passes through power factor correction circuit 406 and then to half bridge switch 404 and inductive/capacitive matching circuit 402. The assembly can also include a low voltage power supply 408 which receives line voltage and outputs a low voltage suitable for powering microprocessor circuitry 340 and transceiver circuitry 390.

The feedback to the microprocessor which allows for variable light output constitutes the values of the fluorescent bulb's arc current and voltage which are provided to the microprocessor circuitry 340 through ballast interface 420. These values are used to generate an output frequency which is fed to the fixture's half bridge switch 404, again through the ballast interface. As noted above, the half bridge switch is coupled to the fluorescent lamp(s) through inductive/capacitive lamp matching network 402. By varying the output frequency produced by the microprocessor, the arc current through the bulb can be adjusted which, in turn, determines the bulb's brightness. The filament current also varies with the output frequency, but to a lesser extent than the arc current. Inductive/capacitive network 402 ensures that the filament current remains substantially constant even though arc current is changing to change the brightness of the bulb. A substantially constant filament current is of value since low currents result in filament sputtering and high currents result in filament vaporization, both of which are associated with short filament life and thus premature lamp failure. See, for example, U.S. Pat. No. 4,370,600.

RF communication with fluorescent light fixtures is challenging because the electronic ballast and wiring to the lamps are generally enclosed in metal, which blocks RF transmission. To address this problem, in FIG. 4, the RF output is capacitively coupled to the wires leading to the lamp (see reference numbers 412 in FIG. 4). These wires extent beyond the fixture's metal housing and thus are capable of functioning as an antenna for the transceiver subunit of the SDD-controller. An alternate construction involves piercing a hole through the fixture's metal housing and passing an antenna 430 through the hole. This alternative works best for new fixtures since the hole can be reliably produced at the factory rather than relying on an in-field modification.

Figure 5:
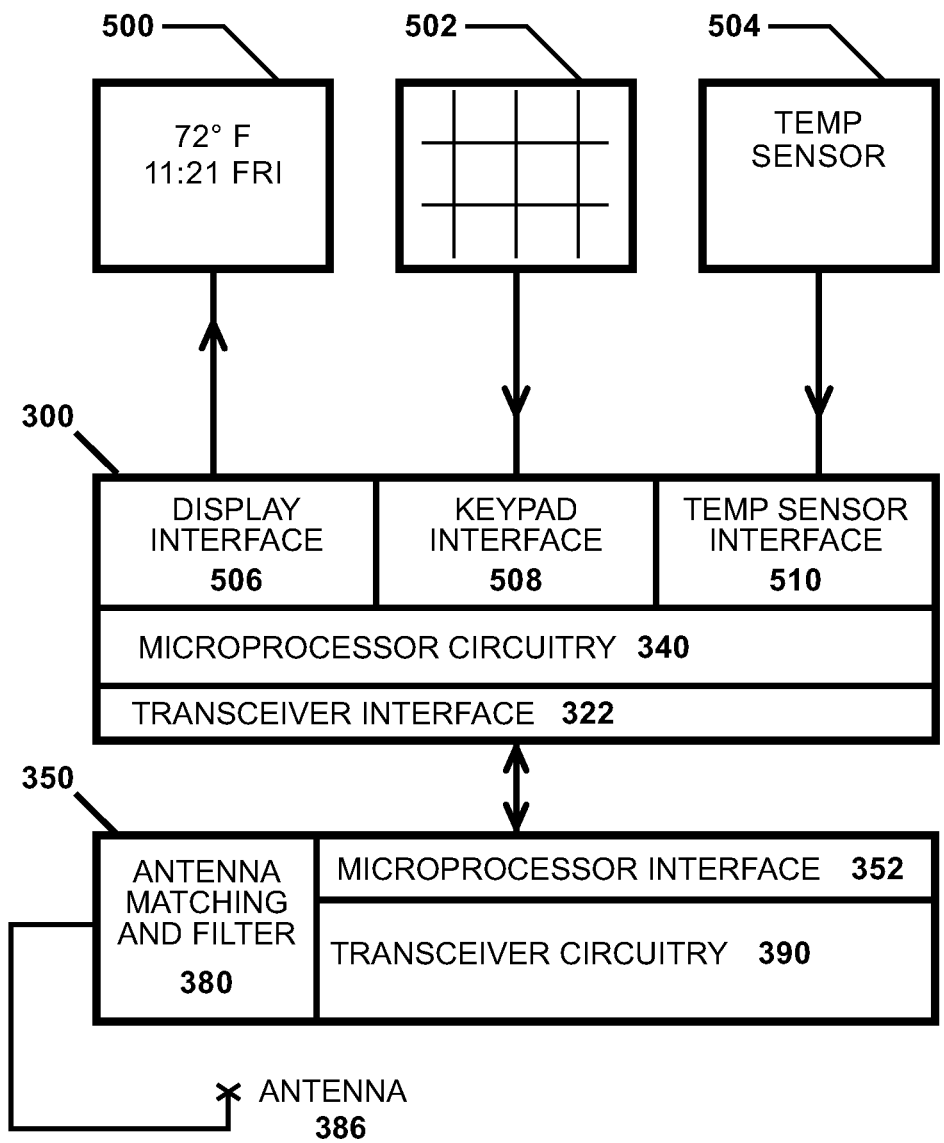
FIG. 5 is a circuit block diagram of an embodiment of a thermostat CAsm.

FIG. 5 shows suitable circuitry in the case of a SDD which is thermostat. In this case, the microprocessor circuitry 340 can interface at a low voltage with the thermostat's display 500, keypad 502, and temperature sensor 504 using interfaces 506, 508, and 510, respectively. In an embodiment, the thermostat appears to the user as functioning in the same manner as a conventional thermostat. However, because it includes RF subunit 350, one or more PPTool(s) and/or one or more CCtrl(s) can communicate with the thermostat to monitor, override, or otherwise change/control the user's inputs. Aside from normal control/monitoring functions, a thermostatic CAsm can provide information to one or more PPtool(s) and/or one or more CCtrl(s) of fault conditions, e.g., a condition under which a desired temperature cannot be maintained by the thermostat indicating a system failure requiring intervention by the maintenance staff.

The above examples of a fluorescent light fixture and a thermostat are, of course, merely two examples of the types of SDD(s) that can be used in the practice of the present disclosure. The SDD can be essentially any type of electrical device which is used in sufficient numbers in a facility so as to be in need of efficient identification and categorization.

For example, the SDD can be an input device which provides information to one or more PPTool(s) and/or one or more CCtrl(s) and/or one or more other SDD(s). Examples of input devices which could be in need of identification and categorization include light sensors, temperature sensors, humidity sensors, wall switches, and the like. On the other hand, the SDD can be an output device which can be a relay, a SCR, a TRIAC, or another type of power driver. In turn, such output devices can control motors, pumps, valves, fans, dampers, lights, shades, dimmers, etc. Based on the foregoing disclosure, the skilled person can readily select device interfaces for these and other types of SDD(s) and thus can construct SDD-controller(s) for the devices using circuitry of, for example, the type shown in FIG. 3 or equivalent circuitry now known or subsequently developed.

The SDD-controller can be combined with the SDD at the time the SDD is manufactured or can be retrofitted to SDD(s) already in existence or in service. Retrofitting is relatively easy to perform since the controller uses very low power (e.g., the standby power of the unit can be one the order of 30 microwatts and the power during operation can be on the order of 0.1 watts) and can be packaged in a small space (e.g., the unit can have a packaged volume on the order of 0.25 cubic inches with current technology and can be expected to be even smaller in the future). Indeed, since the controller spends most of its time in its standby (sleep) mode, it can be battery powered, although for many applications connection to the power source for the SDD will be convenient and will avoid the need for periodic replacement of the battery (see, for example, low voltage power supply 408 in FIG. 4). For some applications, e.g., converting a valve to a CAsm, the SDD-controller and a switch for operating the main device, e.g., a relay or TRIAC, will normally be supplied as a single unit with appropriate hardware for mounting.

II. Identification and Categorization of CAsm(s)

However done, i.e., whether at the factory or in the field, each SDD-controller and thus each CAsm needs to have an identification number that is unique with respect to all other identification numbers used for SDD(s) in a particular facility, where the facility may include more than one physical plant.

One convenient way to achieve such uniqueness is to sequentially number all SDD-controller(s) with a manufacturer code and a unique sequential number for each unit, e.g., numbering of the controllers in accordance with the MAC numbering system provided by the IEEE. Less sophisticated numbering systems can be used if desired. Also, although absolutely unique numbers throughout a facility is desirable, the identification and categorization procedures disclosed herein can be practiced using, for example, random numbers generated by the microprocessor subunits of the SDD-controller(s), since the probability of duplication in a typical facility from such an approach is low.

Whatever technique is used, each SDD/SDD-controller combination (i.e., each CAsm) when installed and ready for identification and categorization will have a unique identification number through the unique identification number of its SDD-controller. To understand the need for categorization of CAsm(s), it is helpful to consider the typical problem of fluorescent lighting over a shop floor in an manufacturing facility.

As a representative configuration, consider the case of one hundred and fifty fixtures illuminating an area of 10,000 square feet. Conventionally, all the lights are manually turned on when the first person arrives in the morning and turned off when the last person leaves, and no accommodation is made for variations in activity on the shop floor during the workday. Similarly, no accommodation is made for sunlight entering the space through windows or the effects of the time of the year on such natural illumination. Likewise, the lighting load is not responsive to power shortages or load shedding imposed by the local utility.

To reduce power consumption for such a system requires granulizing of the illumination so that it is not all on or all off. To do so requires categorization of the fixtures into groups that can be individually addressed. As one example, the groups could be: 1) the whole shop floor, 2) individual assembly lines by shift, 3) individual warehouse spaces, 4) shipping and receiving areas, 5) areas for supervisory personnel, 6) night lights, 7) shedable fixtures, and 8) unoccupied areas. In addition, the categorization could include larger categories, such as, company, building, floor, and the like.

With such a categorization, one or more CCtrl(s) and/or one or more PPTool(s) could adjust the illumination of the shop floor to match use levels and natural illumination, as well as special situations, such as load shedding. For example, if the shop floor is used in three shifts, the illuminated areas could match the activities of the individual shifts, e.g., shipping and receiving would only be illuminated during the hours when shipping companies operate (e.g., 8 AM to 5 PM), while assembly lines that run three shifts would be illuminated for the entire day. Importantly, using a PPTool, changes in utilization of the shop floor can be easily accommodated. For example, if an assembly line was no longer going be used for three shifts, its lights could be re-categorized as, for example, first shift lights. This could be done in two ways. If sufficient category information had already been recorded for the fixtures, the re-categorization could be performed by a CCtrl or a PPTool. If not, an operator could use a PPTool to send a discovery signal to fixtures in the relevant area which were in need of re-categorization.

As another example, consider the problem of fluorescent lighting over a set of cubicles in an office building. As a representative configuration, consider the case of two dozen cubicles illuminated by forty-eight fluorescent light fixtures. Typically, the lights go on for all forty-eight fixtures when the first person arrives in the morning and go off when the last person leaves. To control such a system requires categorization of the fixtures into groups which can be individually addressed. As one example, the groups could be: 1) all cubicles, 2) early shift cubicles, 3) middle shift cubicles, 4) late shift cubicles, 4) night shift cubicles, 5) night lighting, 6) shedable fixtures, 7) particular individuals, and 8) unoccupied cubicles. In addition, as with the shop floor, the categorization could include larger categories, such as, company, building, floor, and the like.

Whatever categorization is used, each SDD needs to have associated therewith data containing relevant categories applicable to the device. In a typical installation of, say, lighting, the following information is generally needed regarding each light fixture, although more or less information can be used as appropriate: company ID, building number, floor number, area name or number, sub-area name or number, and individual rooms/offices. Other information that can be incorporated in the data include device type, date of installation, maintenance periods, and the like. A variety of protocols can be used for the data, such as assigning particular bytes to each category.

The categorization data is stored in at least one memory and can be stored in multiple memories. For example, the data can be stored in a memory associated with the CAsm, and/or one associated with one or more PPTool(s), and/or one associated with one or more CCtrl(s). By storing the categorization information in the CAsm(s), multiple CAsm(s) can be controlled as a group by issuing just one message from a PPTool and/or a CCtrl which references the desired category or categories.

III. The Portable Programming Tool (PPTool)

A. Introduction

As discussed above, like the CAsm(s), the PPTool includes a microprocessor subunit and a transceiver subunit, which can, for example, employ circuitry similar to that of the CAsm(s). For example, the PPTool can employ circuitry of the type shown in FIG. 3.

A central feature of the PPTool is its ability to determine the proximity of various CAsm(s) within the PPTool(s) discovery range. One convenient measure of proximity is the strength at the PPTool of the RF signal produced by the CAsm.

In an embodiment, signal strength values are acquired through the use of the AGC levels (also known as the Received Signal Strength Indictor or RSSI) of the transceiver subunit of a PPTool (see, for example, AGC 378 of transceiver subunit 350 of FIG. 3). By sending the RSSI back to the microprocessor subunit using the SPI port, the microprocessor can order the responding CAsm(s) by their signal strengths. It should be noted that use of the AGC level as a measure of received signal strength has the important benefit that signal strength can be identified without the need for additional hardware beyond that associated with the transceiver.

As an alternative to received signal strength, proximity information can also be acquired by measuring times of flight between the PPTool and the various CAsm(s) within the PPTool's discovery range. In accordance with this approach, the transceiver subunits of the PPTool and the CAsm(s) need to time stamp their respective outgoing and incoming data streams. In particular, in addition to the other information it sends to the PPTool (see Section II above), each CAsm needs to send back incoming and outgoing time stamps for the discovery signal. The PPTool then uses this data in combination with its own time stamps for the discovery signal and for the receipt of the response from each CAsm to determine each CAsm's time of flight, i.e., $TOF = \Delta T_{PPTool} - \Delta T_{CAsm}$, where $\Delta T_{PPTool}$ equals the difference between the incoming (from the CAsm) and outgoing (discovery signal) time stamps at the PPTool and $\Delta T_{CAsm}$ equals the difference between the outgoing (from the CAsm) and incoming (discovery signal) time stamps at the CAsm. For the time of flight approach, the data rate and RF frequency need to be high enough to resolve the expected differences in times of flight to and from the various CAsm(s), e.g., RF frequencies in excess of 5 GHz and corresponding high data rates will typically be needed.

In certain embodiments, it is desirable for the CAsm(s) to be programmed so that they wait a random time before responding to a discovery signal. In this way, the chances of simultaneous responses from multiple CAsm(s) at the PPTool are minimized. The random wait can, for example, be in the range of 0 to 0.5 seconds. The microprocessor subunit can insert this delay when processing the discovery signal. This random delay feature is applicable both to the signal strength and time of flight approaches. In the latter case, the time stamping of the incoming and outgoing signals at the CAsm(s) and the PPTool automatically accounts for the random delays inserted by the CAsm(s).

B. Examples of Physical Embodiments of PPTool(s)

As discussed above, the PPTool includes a transceiver, a microprocessor, and associated memory. An important feature of the PPTool is its portability so that a user can take the PPTool with him or her and thus use it locally to identify and categorize CAsm(s). As such, the PPTool can have a variety of physical embodiments, representative examples of which are shown in FIGS. 6A-6D. In addition to the transceiver, microprocessor, memory, and associated hardware, each of these embodiments has a keyboard and a display, and associated software which allows the operator to control the operation of the PPTool and thus perform the discovery, identification, and categorization operations.

Figure 6A:
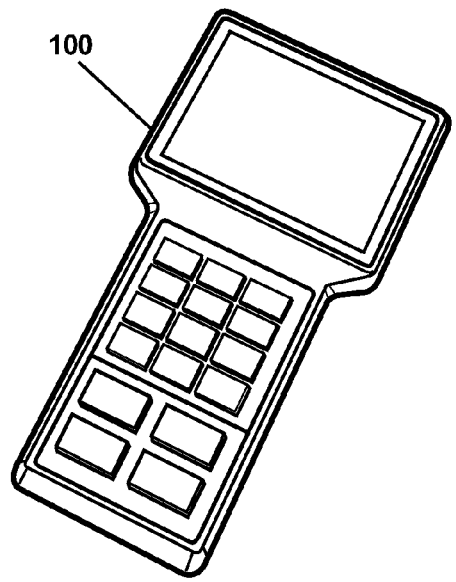
FIGS. 6A-6D are drawings of embodiments of PPTool(s).
Figure 6B:
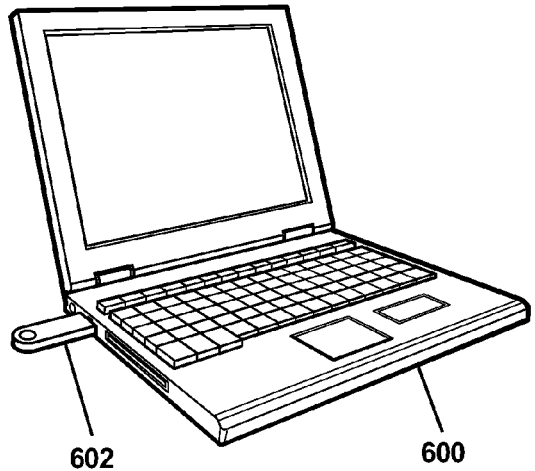
Figure 6C:
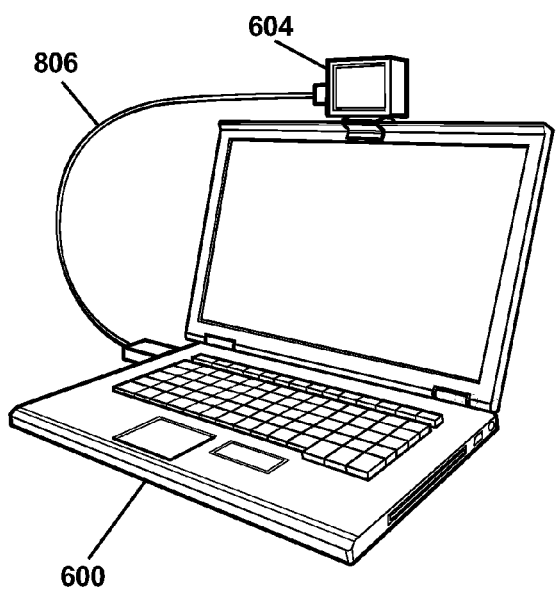

FIG. 6A shows a custom handheld unit of the type shown in FIGS. 1 and 2, while FIGS. 6B and 6C show two embodiments employing a laptop, notebook, or similar portable device 600 interfaced to an RF unit using a USB port. The RF unit can either be incorporated in a USB stick 602 (see FIG. 6B) or can have a separate housing 604 connected to the computer by USB cable 806 (see FIG. 6C). The larger housing can be helpful when a larger antenna is desired for the RF unit. In terms of discovery, a larger antenna is generally not needed, but because in some embodiments, a PPTool can also serve as a CCtrl, a larger antenna may sometimes be desirable to allow a greater range over which control can be exercised. It should be noted that connection of the RF unit through a USB port has the advantage that it allows power to be supplied to the RF unit from the portable device.

Figure 6D:
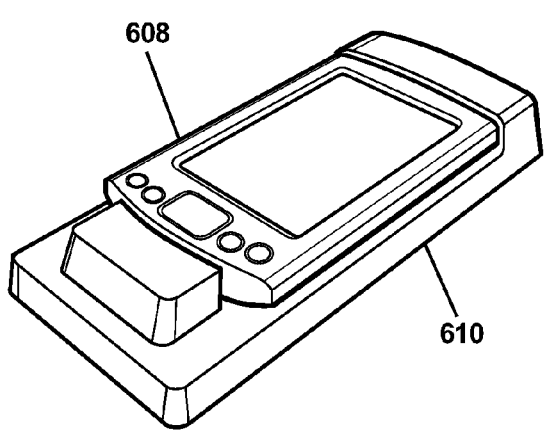

FIG. 6D shows a further embodiment where a PDA, cell phone, or similar communication device 608 is associated with an RF unit for communicating with the CAsm(s) and a battery pack for powering the RF unit and optionally the communication device. As shown in FIG. 6D, the RF unit and battery pack can be in the physical form of a cradle 610 for the communication device. For an embodiment of this type, the communication device can, for example, communicate with the RF unit by a USB port or wirelessly, e.g., by BLUETOOTH.

In order to conduct RF communications, the PPTool includes an RF antenna. A variety of antenna types can be used. In general, the antenna of the PPTool should be designed or operated so as to have a short range so that only a limited number of CAsm(s) respond during discovery and those that do respond are perceived as having a low received signal strength at the PPTool thus allowing better discrimination of relative signal strengths among the responding CAsm(s) by the PPTool. The short range allows inexpensive and small antennas to be used in the PPTool, e.g., a trace on a circuit board.

In a case where a PPTool is also used as a CCtrl, a properly tuned antenna can be used, e.g., a longer circuit board trace (¼ wave), a dielectric antenna, or a molded external dipole, so that when operating as a CCtrl, the PPTool can communicate with a broad range of CAsm(s). During discovery, such an antenna can be attenuated or the transceiver can be programmed to transmit at lower power levels and to have reduced receiver sensitivity.

Such properly tuned antennas can also be used in the CAsm(s) and/or the CCtrl(s). In both cases, the resulting greater ranges are desirable during control operations of the CAsm(s). If the range is still insufficient to cover the entire population of CAsm(s), multiple CCtrl(s) can be used and/or some or all of the CAsm(s) can function as repeaters (see below). In general terms, RF can be used when the communication is a close range communication, and RF plus RF repeaters can be used when the communication is over longer ranges. Communication by wire can, of course, be used for both short and long range communication, e.g., to control and/or recategorize CAsm(s). Also, instead of a single RF transceiver, CAsm(s) can include two transceivers with different ranges, e.g., one for use in communicating with PPTool(s) and the other for communicating with CCtrl(s), with the transceiver that communicates with PPTool(s) having a shorter range than the one that communicates with CCtrl(s).

C. Example of PPTool Circuitry

Figure 7:
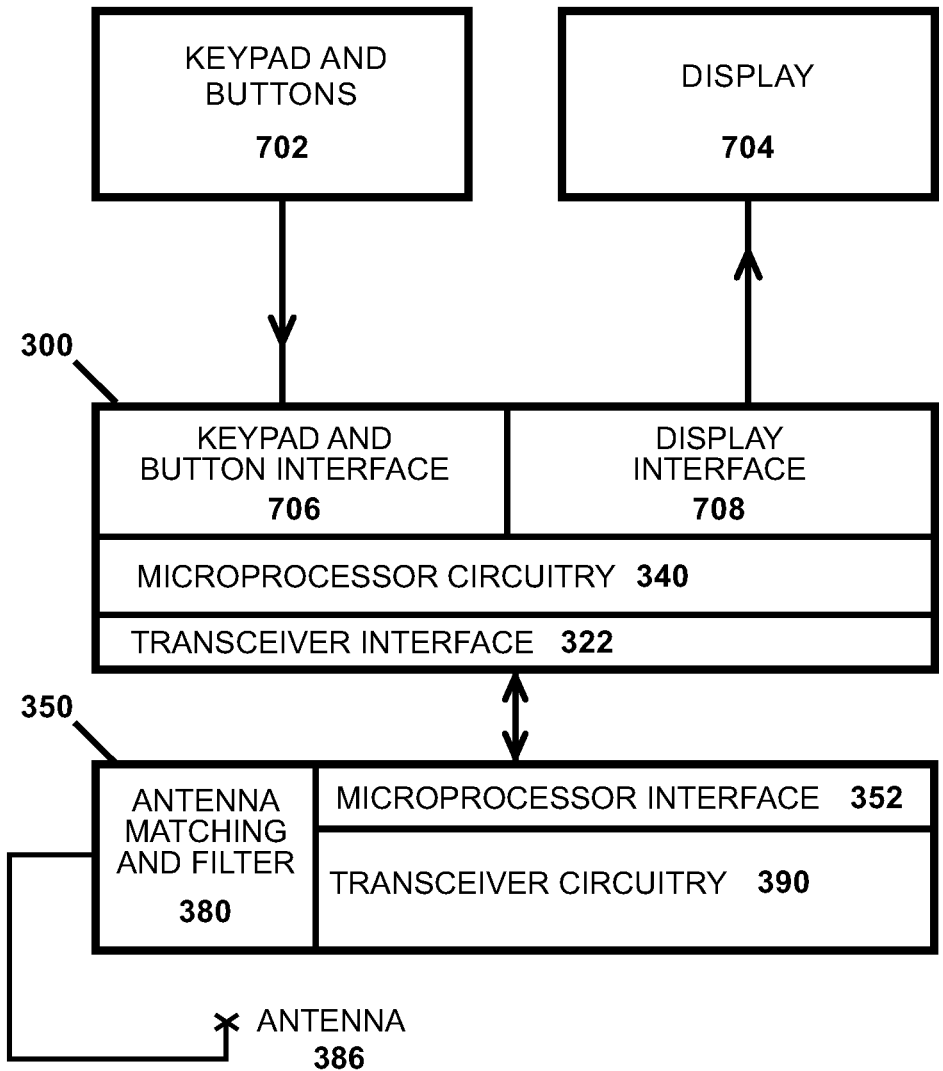
FIG. 7 is a circuit block diagram of an embodiment of a PPTool.

As discussed above, the PPTool can use circuitry of the type shown in FIG. 3. FIG. 7 shows the FIG. 3 microprocessor/transceiver circuitry applied to, for example, the handheld PPTool of FIG. 1 and FIG. 6A. As shown in this figure, microprocessor circuitry 340 communicates with the PPTool's keypad and specialized buttons 702 through interface 706 and to display 704 through interface 708. The microprocessor also performs 2-way communication with transceiver circuitry 390 through interfaces 322 and 352, and the transceiver circuitry communicates with the CAsm(s) and/or one or more CCtrl(s) through antenna 386 and its associated circuitry.

Figure 8:
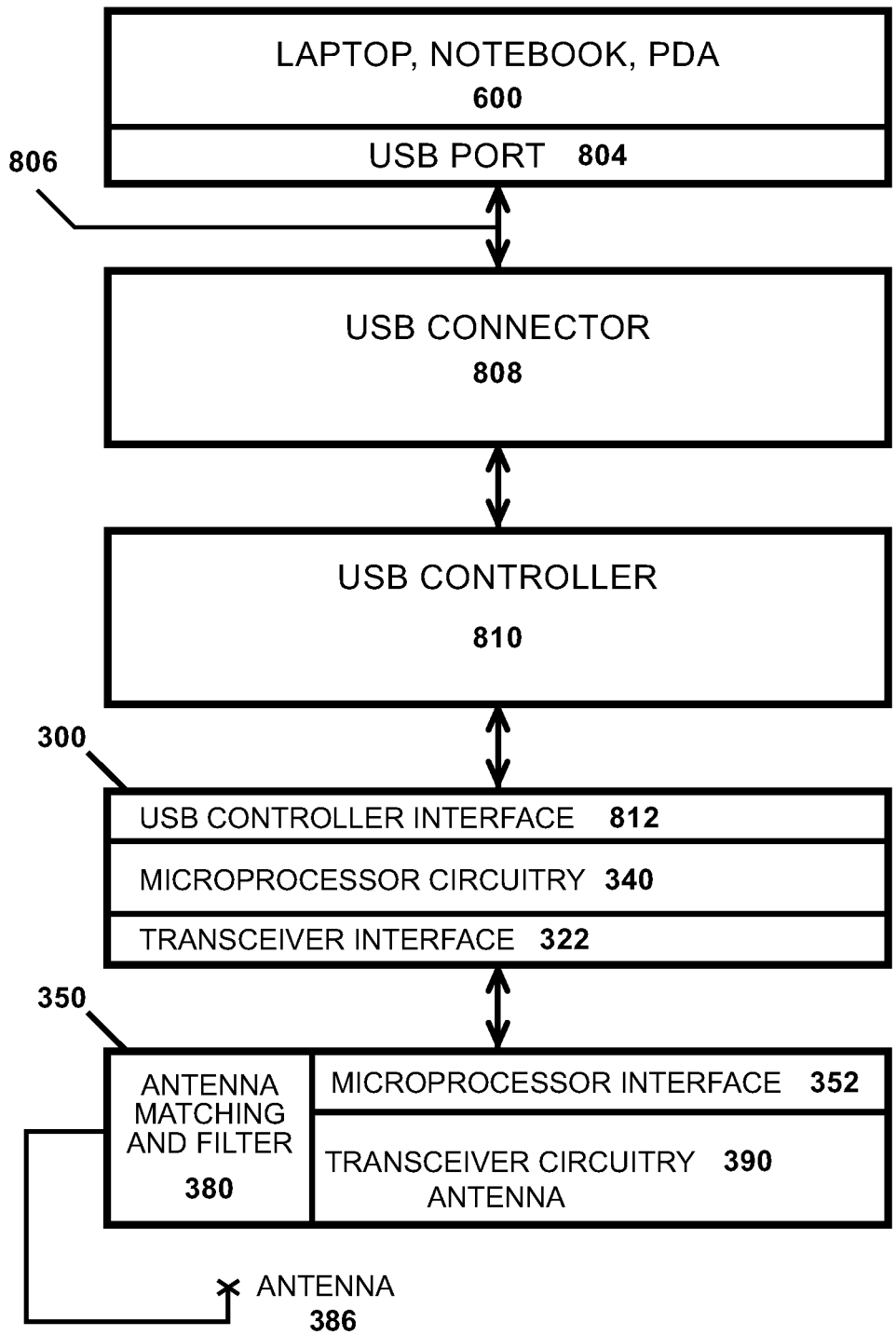
FIG. 8 is a circuit block diagram of an embodiment of a PPTool which employs a USB interface.

FIG. 8 shows suitable circuitry for the case where the PPTool employs a laptop, notebook, PDA, or the like, e.g., the embodiments of FIGS. 6B, 6C and 6D when the communication with the RF unit is by way of a USB port. In this case, the microprocessor circuitry 340 communicates with USB controller 810 through interface 812. The USB controller can, for example, be a dedicated USB to serial device or another microprocessor programmed to translate the USB data to serial data and vice versa. In some cases, depending on its peripherals, the microprocessor of controller 810 can be the same microprocessor as used in microprocessor subunit 300. The connection to the USB controller 810 is a conventional USB connector 808 which mates with off-the-shelf cable 806 which mates with USB port 804 of portable device 600. In the case where the RF unit is in the form of USB stick 602, cable 806 is omitted and USB connector 808 plugs directly into the portable device's USP port 804.

At present, there are three levels of USB port, i.e., USB1.1, USB2.0, and USB3, any of which can be used in connection with the present disclosure. Likewise, future USB variations can be used, as well as connection hardware and protocols that may be developed in the future to supplement or replace the USB hardware and protocols.

D. Example of PPTool and CAsm Programming and Operation

The microprocessor subunit of the PPTool can be programming in a variety of ways using a variety of programming languages. A representative example of a suitable flowchart which can be executed in, for example, the C programming language, is set forth in FIG. 9. In discussing this flowchart, for ease of presentation, it will be assumed that the operator is using a handheld PPTool, e.g., PPTool 100 of FIG. 1, it being understood that similar commands can be executed from other devices, e.g., by using a dropdown menu or function keys on a laptop or PDA.

Figure 9:
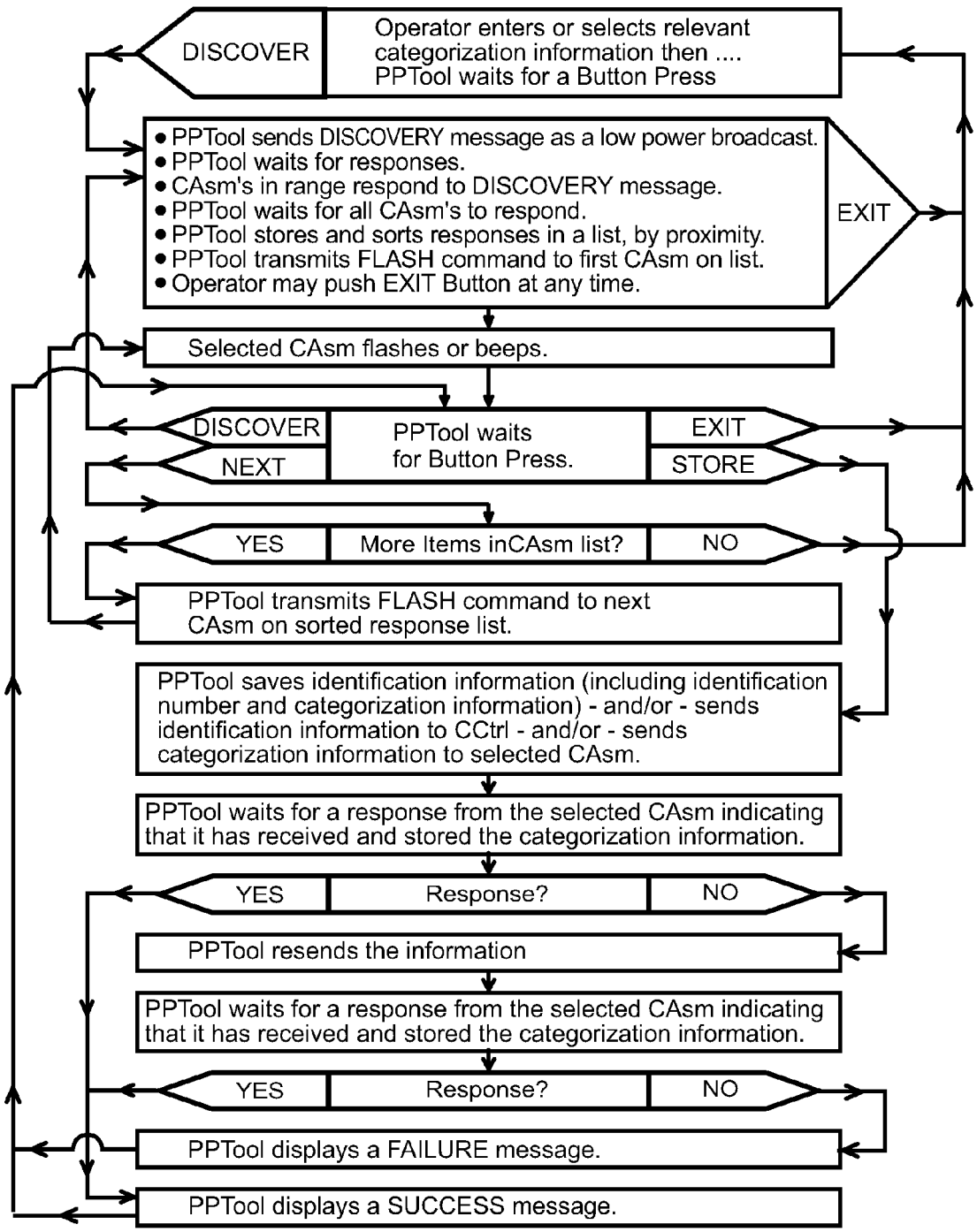
FIG. 9 is a flow chart showing an embodiment of programming and operation of a PPTool.

As shown in FIG. 9, the process begins with an operator entering or selecting relevant categorization information using, for example, keypad 104 and display 102 (see FIG. 1). After the operator is satisfied with the categorization, he/she pushes DISCOVER button 106 which causes the PPTool to send a DISCOVERY message as a low power broadcast. The PPTool then waits for responses, and the CAsm(s) in range respond to the DISCOVERY message.

In one embodiment, the DISCOVERY message contains received signal strength threshold information (the "discovery threshold") which sets a minimum signal strength at the CAsm for response by the CAsm. That is, if the DISCOVERY message is below the specified level at a CAsm, the CAsm will not respond to the message even though it has received and processed the message. In this way, only CAsm(s) within close proximity will respond to the DISCOVERY message and become part of the PPTool's sorted list of responding CAsm(s). By adjusting the discovery threshold, the number of CAsm(s) responding can be increased or decreased as appropriate. In some embodiments, such an adjustment can be made in real time using the keypad and display of the PPTool.

After a delay, the PPTool sorts the responses from the responding CAsm(s) by signal strength and/or time of flight. The PPTool then transmits a FLASH message to the first CAsm on the sorted response list. The operator looks for the response of the CAsm in the form of a flash or a tone and if the correct CAsm has responded, the operator pushes STORE button 108 which causes the PPTool to save identification information, including the identification number of the responding CAsm and category information for that CAsm, at least in its local memory. If no CAsm responds to the FLASH message, the operator can again push DISCOVER button 106 or can exit by pushing EXIT button 112. If a CAsm does respond, but it is not the desired CAsm, the operator can push NEXT button 110 or DISCOVER button 106, as appropriate (e.g., if the NEXT button has been pushed multiple times and the desired CAsm has not respond to the FLASH message, the operator can change his/her location so as to be closer to the desired CAsm and press the DISCOVER button from that location to restart the identification/categorization process).

In addition to storing categorization information in its memory in response to an operator pushing the STORE button, the PPTool will normally send categorization information to the CAsm. Moreover, the PPTool can also send identification information, including categorization information, to one or more CCtrl(s), which may be programmed to acknowledge the receipt of the information. To ensure that the CAsm has received and stored its categorization information, the STORE message from the PPTool can request an acknowledgement from the CAsm. If an acknowledgement is not received after a timed delay, the PPTool can try again. If an acknowledgement is received, a SUCCESS message can be displayed to the operator. If not, a FAILURE message can be displayed.

In either case, control returns to the operator who can push DISCOVER button 106 again to restart the process, or can push NEXT button 110 to start communication with the next CAsm on the list, or can push EXIT button 112 to end the identification/categorization session and return to the PPTool's initial state where it is waiting for the operator to enter or select relevant categorization information using, for example, keypad 104 and display 102.

In one embodiment, the categorization information will include an item number, e.g., the first, second, third, etc. light fixture in a particular office. To facilitate such numbering, the PPTool can be programmed to automatically select the same categorization information with an incremented item number when the operator pushes the STORE button, thus streamlining the categorization process for the operator.

It will be recognized that the above description of the operation of a PPTool is merely for purposes of illustration and numerous variations and modifications can be made. For example, the PPTool will normally have a sleep mode, a power shut down procedure, a start up procedure and the like, all of which are conventional for software driven devices. Similarly, the display and touch screen of a cell phone or PDA can be used to perform the PPTool functions. In the case of a laptop or other portable computer, more extensive menus can be provided to the operator because of the larger display, which can facilitate the identification/categorization procedure especially for large industrial and/or commercial applications. Also, PPTool(s) which include full keyboards, e.g., a netpad or notepad, will make entering of categorization information easier for the operator than PPTool(s) which contain only a rudimentary keyboard. It should be noted that the display presented to an operator by the PPTool need not be the same for all CAsm(s), but can vary based on the nature of the CAsm. That is, when responding to a DISCOVERY message, a CAsm can include identification information which is used by the PPTool to determine what menu information should be provided to the operator.

Figure 11:
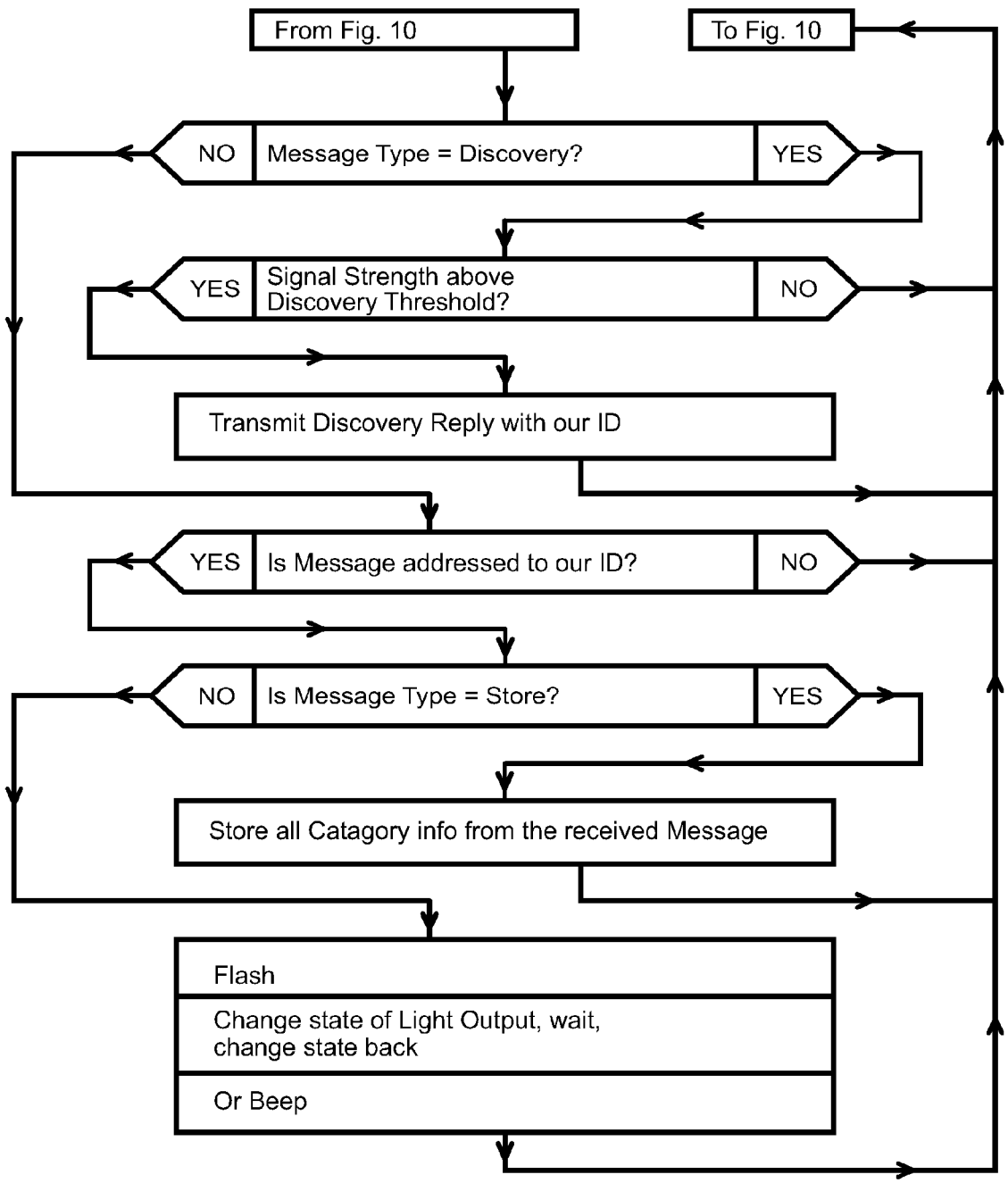

The PPTool programming interfaces with the programming of the CAsm(s). FIGS. 10 and 11 show an example of suitable CAsm programming for use with the PPTool programming of FIG. 9, as well as with one or more CCtrl(s). The programming also provides for interaction between CAsm(s) so as to achieve a repeater function to extend the RF range when needed. As with the PPTool programming of FIG. 9, the programming of FIGS. 10 and 11 can be performed in C or other programming languages as desired.

As shown in these FIGS. 10 and 11, the CAsm's programming of this embodiment performs the following operations:
(1) continuous scanning for incoming messages and determining whether messages should be retransmitted—blocks 1301 through 1305 in FIG. 10;
(2) segregating CONTROL messages from DISCOVERY, STORE, and FLASH messages—block 1306 in FIG. 10;
(3) processing CONTROL messages—blocks 1307 through 1313 in FIG. 10; and
(4) processing DISCOVERY, STORE, and FLASH messages—FIG. 11.

Although many approaches can be used to perform these functions, one suitable approach involves assigning an index value N to each message and to the message's content and associated parameters, e.g., the message's unique ID, the number of allowable signal repeats (hops) for the message, the message's received signal strength value (RSSI value) at the CAsm, and the message's associated timer for sending a repeat message. In the discussion that follows, these parameters for each unique message(N) are identified by the nomenclature ID(N), HOPS(N), RSSI(N), and TIMER(N), respectively. The parameters can be incorporated in the message or separately stored. If desired, other information can be included in the message or separately stored such as repeat signal strength threshold, a timeout value, and the like. Alternatively, rather than being associated with each message, at least some of these parameters can be globally defined for the CAsm, e.g., by hard-coding in firmware, through a global message from a CCtrl, or the like.

There are three main paths through the specific programming of FIGS. 10 and 11. In the first path, there is no incoming message and the system determines if it should retransmit one or more previously received messages; in the second path, there is an incoming message and that message is a new message; in the third path, there is also an incoming message but it is a duplicate of a previously received message. The second path itself has two sub-paths, i.e., a first sub-path where the incoming message is a CONTROL message and a second sub-path where it is a DISCOVERY, STORE, or FLASH message.

A convenient way to examine the operation of the programming of FIGS. 10 and 11 is to begin by considering the handling of an incoming message, i.e., the second and third paths. In FIG. 10, block 1301 scans for incoming messages and upon receipt of a message, the program branches to block 1306. Block 1306 determines whether the message is a CONTROL message or a DISCOVERY, STORE, or FLASH message.

If a CONTROL message, the program branches to block 1307 which uses the message's unique ID to determine if the message is a new message or a duplicate message. In particular, block 1307 determines if ID(N) equals the new message's unique ID for any value of N. If not, i.e., if the message is a new unique message, the program branches to block 1310 which examines an array of timers to find an index value N where timer(N) is flagged as timed out, signifying availability of the index for use. (Note that at start-up, all timers are flagged as timed out and that the number of timers is selected so that at least one timer which is flagged as timed out is essentially always available for an incoming new message.) As discussed below, the array of timers is used in connection with block 1303 in determining when a decision on retransmission of the message should be made. Once N has been selected, block 1311 uses N to (1) set up a timer(N), (2) store the RSSI value for the message in RSSI(N), (3) store the received message's hops value in HOPS(N), (4) store the message itself in message(N), and (5) store the unique message ID in ID(N). Although the time period (time window) set in timer(N) can be a constant, transmission congestion can be avoided by making its length random, e.g., in the range of 0 to 0.25 seconds.

Thereafter, control transfers to block 1312 in which the category information in the message is compared with the CAsm's stored category information. If no match is found, control is returned to block 1301. If a match is found, the CONTROL message is executed or an execution trigger, a set of execution variables, or the like is set, and control is then returned to block 1301.

It should be noted that the procedures of block 1311 are of value even in the case of no category match, because those procedures allow for efficient repeating of messages which is needed in cases where the RF range is insufficient to cover an entire facility, which is often the case.

If the message is a duplicate message, control passes from block 1307 to block 1308 where the duplicate message's RSSI value is compared with the stored RSSI(N) value for the message corresponding to the duplicate message. The goal of this comparison is to store in RSSI(N) the largest RSSI value received at the CAsm for any copy of the message. In this way, the system can avoid retransmitting strong signals and only retransmit weak signals so as to minimize bandwidth usage and thereby lower interference. Specifically, if a strong duplicate signal is received at a particular CAsm, the CAsm can assume that its area is being covered by some nearby neighbor CAsm (or the CCtrl or PPTool acting as a central controller) and thus there is no need for it to also retransmit the message. As discussed below, the retransmit decision is made in block 1304 using the value stored in RSSI(N). It is of course to be understood that this approach of comparing RSSI values is just one of many possible approaches for reducing bandwidth requirements and other techniques can be used if desired, e.g., the CAsm can be programmed to determine nearest neighbor distances and based on those distances, a repeat map can be developed and implemented by the CAsm(s) as a group to determine which units should repeat and which should not.

If the RSSI value for the duplicate message is less than RSSI(N), control returns to block 1301. If not, control is transferred to block 1309 which substitutes the RSSI value for the duplicate message for the current value of RSSI(N) thus storing the strongest received message to date, and then control returns to block 1301.

If instead of a CONTROL message, the message is a DISCOVERY, STORE, or FLASH message, the program branches from block 1306 to the flowchart of FIG. 11. This flowchart first analyzes the message to determine whether it is a DISCOVERY message and, if so, determines whether the message's signal strength is above the discovery threshold discussed above in connection with FIG. 9. If the signal strength is below the discovery threshold, control returns to block 1301 of FIG. 10. If the signal strength is above the discovery threshold, the CAsm responds to the PPTool with its identification information, including at least its unique identification number. If the message from the PPTool has included a power level specification for the CAsm's response, the CAsm adjusts the output of its transmitter to match the specified level. Again, once the response to the PPTool has been sent, control returns to block 1301 of FIG. 10.

If the message is not a DISCOVERY message and if the message does not include the CAsm's unique ID, control is again returned to block 1301 of FIG. 10. If the message does include the CAsm's unique ID, a check is made to determine if the message is a STORE message and, if so, any category information included in the message is stored in the CAsm's memory and control returns to block 1301 of FIG. 10. If not a STORE message, the CAsm checks to see if the message is a FLASH message and if so, it produces an appropriate visual or audible signal. Control then returns to block 1301 of FIG. 10.

As discussed above, block 1301 of FIG. 10 continually checks for incoming messages. When a message is not being received, control is passed to 1302 which determines if any for any value of N, timer(N) has been flagged as just timed out. If not, control returns to block 1301. If so, the value of HOPS(N) is used to determine if retransmission is required. Specifically, if HOPS(N) is zero, then all permitted repeats have been made somewhere in the system and control returns to block 1301. If HOPS(N) is greater than zero, control is passed to block 1304 which applies a second criterion to the repeat decision process, namely, a signal strength criterion. Specifically, if the current RSSI(N) value is above a preset signal strength value (the repeat signal ceiling), the message should not be repeated and control is returned to 1301. That is, at least one adjacent device, e.g., a CAsm or a CCtrl or a PPTool acting as a central controller, has a strong enough signal to cover the area associated with the particular CAsm as evidenced by the current high value of RSSI(N) and thus retransmission is not needed. If the RSSI(N) value is less than the repeat signal ceiling, retransmission is appropriate and thus message(N) is retransmitted with its internal HOPS value decremented by one. Also (not shown in FIG. 10), ID(N) is cleared and timer(N) is set to timed out allowing the N value to be rediscovered as unused in block 1310. Thereafter, control is returned to block 1301.

The foregoing flowcharts are of course only provided for purposes of illustration and not to limit the invention in any way. Based on the present disclosure, persons of ordinary skill in the art can implement the functionality of these charts in numerous ways and in numerous programming languages other than those illustrated and discussed herein.

IV. The Central Controller (CCtrl)

Central control can be performed in a variety of ways using a variety of equipment. For example, the central controller can comprise standard Ethernet communication equipment and a SQL database or it can be based on proprietary equipment such as that sold by HONEYWELL and JOHNSON CONTROLS.

In general terms, the CCtrl will include a memory for storing information regarding the CAsm(s) and the desired modes of operation of the CAsm(s). It will also include an RF unit and associated microprocessor for communicating with the CAsm(s). Physically, the CCtrl can be a single unit, e.g., a portable computer, desk top computer, server, or the like, equipped with an RF unit, where the computer has been programmed to control the CAsm(s).

Alternatively, the CCtrl can be divided into a plurality of parts which communicate with one another over, for example, Ethernet. In such a case, a central data base can be maintained and edited, which can be desirable where large installations are to be controlled, e.g., installations having multiple buildings which can be in different localities. Commands can then be sent by Ethernet to a local device equipped to communicate with the local CAsm(s).

Figure 12:
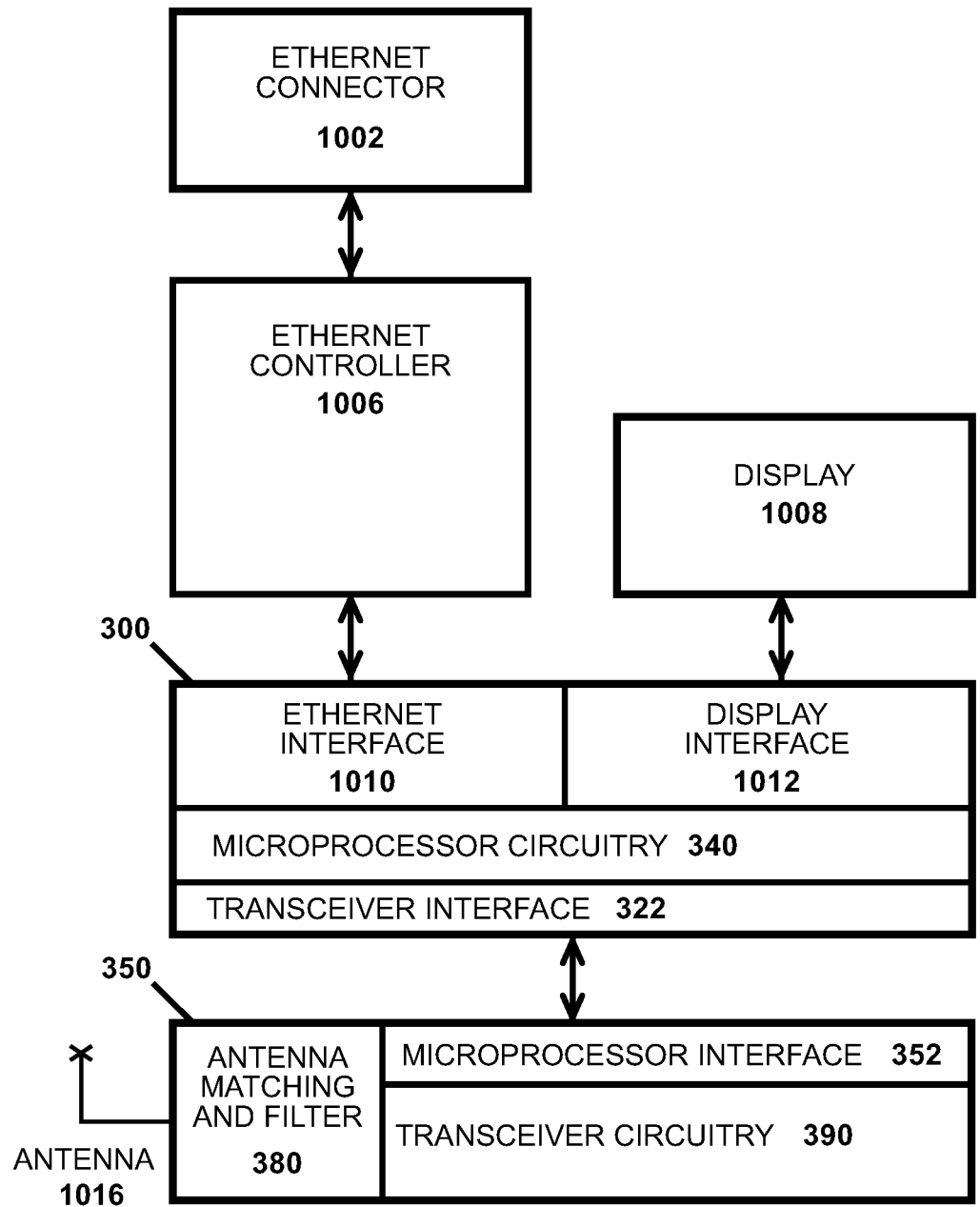
FIG. 12 is a block diagram of an embodiment of an Ethernet communication circuit.
Figure 13:
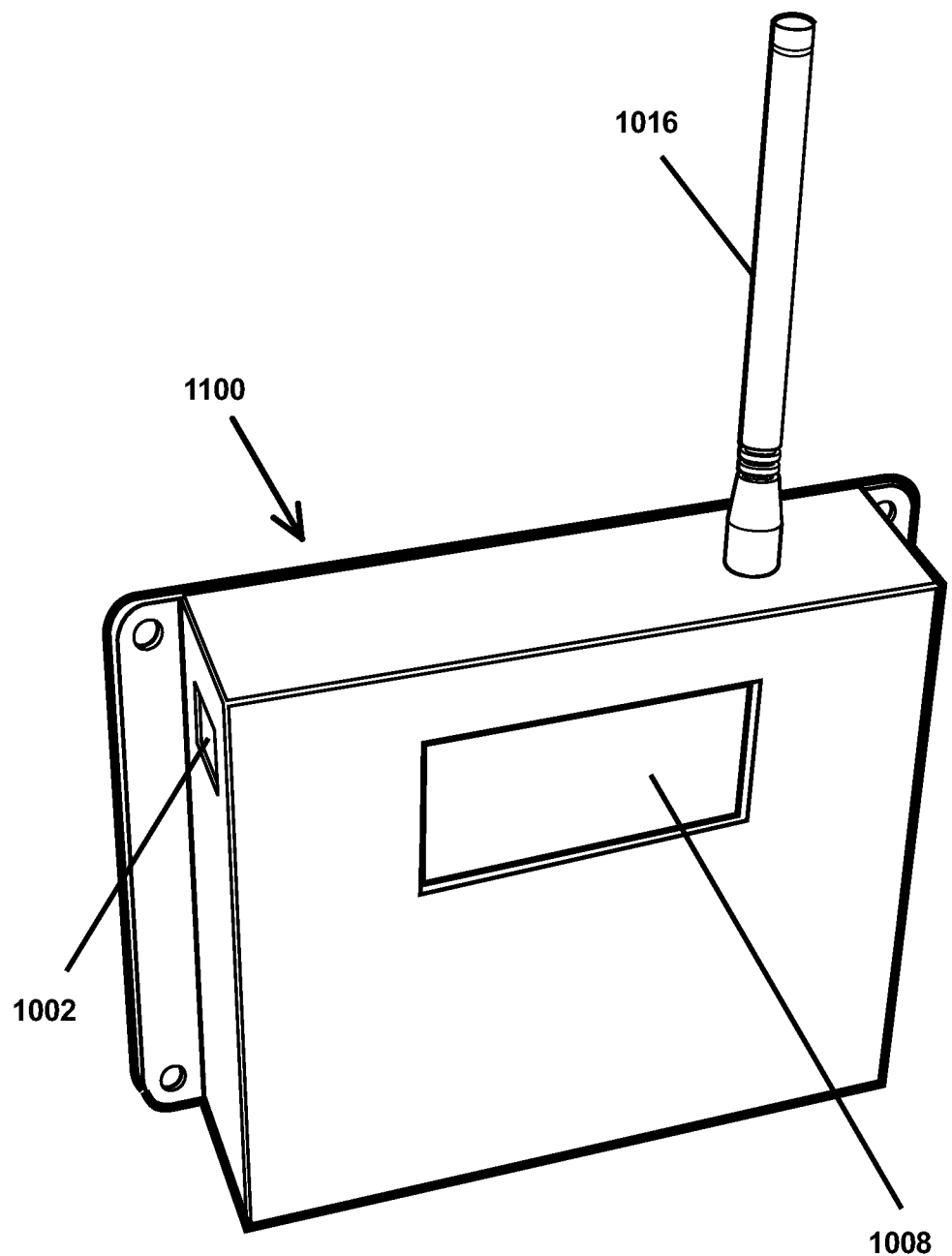
FIG. 13 is a drawing of a physical embodiment of the Ethernet communication block diagram of FIG. 12.

FIG. 13 shows a physical embodiment of a local device 1100 which includes Ethernet connection 1002, display 1008, and antenna 1016. FIG. 12 shows circuitry that be used for the local device. As can be seen in this figure, the electronic structure of the local device can correspond to that of the PPTool and the CAsm(s) and thus can include a microprocessor subunit 300 and a transceiver subunit 350 which communicate with each other through transceiver interface 322 and microprocessor interface 352. The microprocessor circuitry 340 communicates with the central data base through Ethernet interface 1010 and Ethernet controller 1006. The Ethernet controller receives and transmits data through Ethernet connector 1002, which is connected to, for example, a local area network. Information regarding the status of the local device is provided to the operator by display 1008 which communicates with the microprocessor circuitry through display interface 1012.

A representative mode of operation for such a system employing a central data base can be as follows. All pertinent control data is transmitted over Ethernet to local device 1100 and stored in the memory of the local device's microprocessor subunit. In one embodiment, the data is sufficient for the local device to control the local CAsm(s) without further communication from the central data base. In this way, if the computer with the central data base or the Ethernet connection goes down, control of the CAsm(s) can continue under the control of the local equipment. In some cases, it may be desirable to have multiple local devices 1100 in a particular installation so as to provide redundancy in case one of those local devices should fail. The local devices can be updated through the Ethernet connection as needed and can also transmit information back to the central data base using that connection. Such return information can include data regarding the performance and condition of the CAsm(s), as well as the condition of local device 1100.

It should be noted that local device 1100 can function as a fully stand alone CCtrl, e.g., once it has received information from a central data base or a PPTool. In such a case, microprocessor subunit 300 will normally have a larger capacity, e.g., larger memories and a faster processor, than used in the PPTool, the CAsm(s), or a smaller local device 1100 which operates under continual control of a central data base.

Although typically the CCtrl will control all or a large portion of a facility, "mini" CCtrl(s) (e.g., portable CCtrl(s)) can also be used to, for example, address particular categories of SDD(s), e.g., particular categories of lights. For example, a user could have a pocket-sized portable CCtrl for turning on different banks of warehouse lighting. More generally, a wireless light switch for a bank of lights could function as a CCtrl, e.g., it could communicate with another CCtrl and/or it could be mechanically activated by a user. Likewise, a dedicated CCtrl with an occupancy sensor, e.g., a motion detector, could be used to turn on a set of lights when a person enters a particular area of a facility. Alternatively, an occupancy sensor can be incorporated directly in one or more CAsm(s).

Typically, the commands sent by a CCtrl will be executed when received. Alternatively, the commands can comprise a schedule to be executed at a later time or date. In such a case, the CAsm(s) can include a real time clock so that they can determine when to execute the schedule. Alternatively, the schedule can be stored in a local controller with a real time clock, which then sends messages to CAsm(s) based on the schedule. The schedule can, of course, be executed by sending messages to the CAsm(s) from a CCtrl or a PPTool functioning as a CCtrl.

V. Representative Scenarios

The identification and categorization systems and methods discussed above allow for a variety of procedures previously unattainable without extraordinary effort. The following represent just a few of the types of procedures that can be executed once the energy consuming devices in a facility have been identified and categorized.

A. Load Shedding by Power Companies or Power Aggregators

Load shedding has become a major problem for power companies to avoid peak demand overloads. Today, load shedding is primarily performed on a manual basis with the energy provider contacting major users and requesting them to shed a portion of their energy demand. Using the identification and categorization systems and methods disclosed herein, such major users can more efficiently respond to such requests. Indeed, by selectively dropping their needs for heating, cooling, and lighting, the major users may be able to continue manufacturing or commercial activities without interruption, even though their energy usage has dropped significantly.

More generally, because of the ease of control provided by the present disclosure, it becomes practical for even smaller users to participate in load shedding, thus minimizing the overall impact of the shedding on comfort and economic activity. Indeed, in the future, energy providers can be allowed access to the CCtrl(s) of some or all of their customers and thus can implement load shedding on a fully automatic basis. By agreement between, for example, a load shed aggregator and power customers, the load shedding can be customized for individual customers to consist of changes in particular thermostat settings in particular buildings or portions thereof, e.g., during the summer, selected thermostats could be raised by a few degrees to shed load during peak demand periods. The present system allows easy categorization of which thermostats or zones participate in the load shedding program and the extent to which they participate. Likewise, lighting can be part of the load shedding protocol. Thus, certain lights can be shut off in non-critical locations and other lights can be dimmed.

Using a PPTool, a user can easily walk through his/her facility and categorize those thermostats and/or lights which are to participate in the load shedding program, the extent of participation and the order in which thermostats are offset and lights shed depending on the severity of the power emergency. Importantly, when the power emergency ends, the return to normal operation can again be fully automatic and negotiated between the consumer and the provider.

B. Setting Night Lights

In most commercial and industrial facilities, at night, a small portion of fluorescent lights are normally left on. In current practice, the lights that are left on are hardwired to a specific "night light" circuit. To change the night lighting is a major undertaking which requires rewiring of fixtures. Moreover, even the initial distribution of night lighting is often suboptimum because the facility has not actually been put into use and thus the actual locations of machinery, aisles, and work areas are not yet known with final precision. Also, it is the rare facility that does not change at least some of its layouts over time, which often makes the initial night lighting placement even worse.

The present disclosure addresses this problem in two ways. First, using a PPTool, the user can walk the facility's floors at night and identify and categorize the fixtures that should belong to the night lighting group in real time. Second, if there are plant layout changes, modification of the night lighting is as simple as the original categorization, e.g., by again walking the floor with a PPTool and observing night light coverage. Also, in some cases, it may be possible to accommodate the new layout using information stored in the CCtrl without the need for a second walkthrough. For example, a decommissioned warehouse may no longer need any night lighting or minimal lighting, either of which can be effectuated from a CCtrl.

A variety of modifications that do not depart from the scope and spirit of the invention will be evident to persons of ordinary skill in the art from the foregoing disclosure. For example, the RF communications described herein can be encrypted and may include customer identification numbers and/or passwords to prevent tampering or inadvertent crosstalk between spatially adjacent implementations. The following claims are intended to cover the specific embodiments set forth herein as well as modifications, variations, and equivalents of those embodiments.

What is claimed is:

1. A method for identifying an individual electrical device among a plurality of spatially-distributed electrical devices, each of the devices having associated therewith its own RF transceiver and its own microprocessor and associated memory for storing (i) an identification number and (ii) category information, where category information is:
   (a) information other than the device's identification number by which the device can be selectively communicated with, and
   (b) information that can be changed from time-to-time,
the method comprising:
   (A) broadcasting, from a portable device, an RF discovery request to the spatially-distributed electrical devices requesting RF transmissions from the devices of identification information, the identification information comprising at least an identification number;
   (B) receiving, at the portable device, RF transmissions comprising identification numbers returned by devices as a result of step (A) and determining a perceived proximity for each received RF transmission;
   (C) ordering the identification numbers received in step (B) by perceived proximity;
   (D) selecting an identification number from the ordered identification numbers of step (C), the selected identification number corresponding to the device having the closest perceived proximity, and then, as selected by an operator, performing at least one of:
      (i) transmitting an RF signal to the device associated with the selected identification number so as to cause the device to produce a visual or audible signal;

(ii) transmitting an RF signal to the device associated with the selected identification number so as to cause the device to store category information for the device;

(iii) storing category information for the device associated with the selected identification number in a memory associated with the portable device and/or in a memory associated with a remote controller; and (E) as selected by an operator, repeating step (D) with at least one other identification number corresponding to a device having a perceived proximity greater than the closest perceived proximity;

wherein the perceived proximity for each received RF transmission is determined from time of flight, received signal strength, or both time of flight and received signal strength.

2. The method of claim 1 wherein in step (E), the at least one other identification number is the identification number corresponding to the device with the next-closest perceived proximity.

3. The method of claim 1 wherein:
(a) step D(ii) is performed for at least one device; and
(b) the method further comprises:
   (i) changing category information of one or more devices using a category signal which comprises a message and, so as to determine which of the devices is to have its category information changed, at least one of:
      (1) the category information of step D(ii),
      (2) the category information of step D(ii) which has been changed one or more times,
      (3) one or more identification numbers, and/or
   (ii) controlling one or more devices using a control signal which comprises a message and, so as to determine which of the devices is to execute the control signal, at least one of:
      (1) the category information of step D(ii),
      (2) the category information of step D(ii) which has been changed one or more times,
      (3) one or more identification numbers.

4. The method of claim 3 wherein step (b) is performed from a portable device and/or a central controller.

5. The method of claim 3 wherein the category signal and/or the control signal is an RF signal.

6. The method of claim 5 wherein the message of the category signal and/or the message of the control signal is repeated by an RF transceiver associated with at least one of the devices.

7. The method of claim 6 wherein the message of the category signal and/or the message of the control signal is only repeated at the end of a time window and only then if the message to be repeated is associated with a signal strength value less than a signal strength ceiling.

8. The method of claim 7 wherein the length of the time window is random.

9. The method of claim 1 wherein the RF transmissions comprising identification numbers are returned by devices after a random delay.

10. The method of claim 1 wherein in step (A), the RF discovery request broadcasted from the portable device includes a signal strength threshold value which is used by devices to determine if an RF transmission comprising an identification number should be made.

11. The method of claim 1 wherein at least one of the plurality of spatially-distributed electrical devices controls another device.

12. The method of claim 1 wherein the plurality of spatially-distributed electrical devices perform generally the same function.

13. A system comprising:
(A) a plurality of spatially-distributed electrical devices, each of the devices having associated therewith its own RF transceiver and its own microprocessor and associated memory for storing (i) an identification number and (ii) category information, where category information is:
   (a) information other than the device's identification number by which the device can be selectively communicated with, and
   (b) information that can be changed from time-to-time, the microprocessor being programmed to perform at least the following operations:
      (i) receive an RF discovery request from a portable programming tool; and
      (ii) transmit an RF signal comprising an identification number in response to the RF discovery request;
(B) a portable programming tool comprising an RF transceiver and a microprocessor system programmed to perform at least the following operations:
   (i) broadcasting an RF discovery signal which requests spatially-distributed electrical devices to return at least an identification number;
   (ii) receiving RF signals from spatially-distributed electrical devices, the RF signals comprising identification numbers, and determining a perceived proximity for each received RF signal;
   (iii) ordering the identification numbers by perceived proximity;
   (iv) selecting an identification number from the ordered identification numbers, the selected identification number corresponding to the device having the closest perceived proximity,
   (v) receiving an operator input and based on that input, performing at least one of:
      (a) transmitting an RF signal to the device associated with the selected identification number so as to cause the device to produce a visual or audible signal;
      (b) transmitting an RF signal to the device associated with the selected identification number so as to cause the device to store category information for the device;
      (c) storing category information for the device associated with the selected identification number in a memory associated with the portable device and/or in a memory associated with a remote controller; and
   (vi) receiving an operator input and based on that input, repeating (v) with at least one other identification number corresponding to a device having a perceived proximity greater than the closest perceived proximity;
wherein the perceived proximity for each received RF signal is determined from time of flight, received signal strength, or both time of flight and received signal strength.

14. The system of claim 13 further comprising a central controller which communicates by wire or RF with the spatially-distributed electrical devices to control and/or change category information of at least one of the devices.

15. A portable programming tool comprising:
(A) an RF transceiver, and
(B) a microprocessor system programmed to perform at least the following operations:
  (i) broadcasting an RF discovery signal which requests electrical devices to return at least an identification number;
  (ii) receiving RF signals from electrical devices, the RF signals comprising identification numbers, and determining a perceived proximity for each received RF signal;
  (iii) ordering the identification numbers by perceived proximity; and
  (iv) selecting an identification number from the ordered identification numbers, the selected identification number corresponding to the device having the closest perceived proximity, and
  (v) receiving an operator input and based on that input, performing at least one of:
    (a) transmitting an RF signal to the device associated with the selected identification number so as to cause the device to produce a visual or audible signal;
    (b) transmitting an RF signal to the device associated with the selected identification number so as to cause the device to store category information for the device, where category information is:
      (a) information other than the device's identification number by which the device can be selectively communicated with, and
      (b) information that can be changed from time-to-time;
  wherein the perceived proximity for each received RF signal is determined from time of flight, received signal strength, or both time of flight and received signal strength.

16. The portable programming tool of claim 15 wherein the microprocessor system comprises a single microprocessor.

17. The portable programming tool of claim 15 wherein the microprocessor system comprises multiple processors.

18. The portable programming tool of claim 17 wherein the multiple processors comprise a processor of a portable computer or a portable communication device and a microprocessor which communicates with the RF transceiver and with the processor of the portable computer or the portable communication device.

19. The portable programming tool of claim 15 wherein received signal strength is determined using an AGC level.

20. Apparatus comprising:
(A) an electrical device which needs to be identified and categorized;
(B) an RF transceiver; and
(C) a microprocessor programmed to perform at least the following operations:
  (i) receive an RF discovery request from a programming tool;
  (ii) transmit an RF signal comprising an identification number in response to the RF discovery request;
  (iii) receive an RF signal from the programming tool and thereupon produce a human-perceivable visual or audible signal that serves to identify the electrical device to an operator of the programming tool; and
  (iv) receive an RF signal from the programming tool and thereupon store category information for the device in a memory associated with the microprocessor, where category information is:
    (a) information other than the device's identification number by which the device can be selectively communicated with, and
    (b) information that can be changed from time-to-time.

21. The apparatus of claim 20 wherein the microprocessor is programmed to transmit the RF signal comprising an identification number in response to the RF discovery request after a random delay.

22. The apparatus of claim 20 wherein the microprocessor is programmed to repeat at least some RF signals received by the RF transceiver.

23. The apparatus of claim 22 wherein the microprocessor is programmed to perform the repeat after a random delay.

24. The apparatus of claim 20 wherein the electrical device is a lighting fixture.

25. The apparatus of claim 20 wherein the electrical device is a wall switch, a thermostat, a dimmer, a sensor, an output device, or a combination thereof.

26. The apparatus of claim 25 wherein the sensor is a temperature sensor, a humidity sensor, or a combination thereof.

27. The apparatus of claim 25 wherein the sensor is an occupancy sensor.

28. The apparatus of claim 25 wherein the output device is one or more relays, one or more TRIACs, one or more SCRs, or a combination thereof.

* * * * *